United States Patent
Pasulka

(10) Patent No.: US 10,327,217 B2
(45) Date of Patent: Jun. 18, 2019

(54) TECHNIQUES FOR DEVICE REGISTRATION AND PRIORITIZATION IN A CELLULAR AS A SERVICE ENVIRONMENT

(71) Applicant: Zinwave, Ltd, Dallas, TX (US)

(72) Inventor: Matthew P Pasulka, Huntsville, AL (US)

(73) Assignee: Zinwave, Ltd, Cambridge (GB)

( * ) Notice: Subject to any disclaimer, the term of this patent is extended or adjusted under 35 U.S.C. 154(b) by 0 days.

(21) Appl. No.: 15/681,275

(22) Filed: Aug. 18, 2017

(65) Prior Publication Data

US 2018/0054791 A1 Feb. 22, 2018

Related U.S. Application Data

(60) Provisional application No. 62/376,907, filed on Aug. 18, 2016, provisional application No. 62/376,908, filed on Aug. 18, 2016, provisional application No. 62/376,910, filed on Aug. 18, 2016, provisional application No. 62/376,911, filed on Aug. 18, 2016.

(51) Int. Cl.
*H04W 60/00* (2009.01)
*H04W 8/24* (2009.01)
*H04W 12/08* (2009.01)
*H04W 28/24* (2009.01)
*H04W 48/14* (2009.01)
*H04W 8/04* (2009.01)
*H04W 88/08* (2009.01)

(52) U.S. Cl.
CPC ............ *H04W 60/00* (2013.01); *H04W 8/04* (2013.01); *H04W 8/24* (2013.01); *H04W 12/08* (2013.01); *H04W 28/24* (2013.01); *H04W 48/14* (2013.01); *H04W 88/085* (2013.01)

(58) Field of Classification Search
CPC ............................... H04W 60/00; H04W 8/24
USPC .................. 455/435.1, 436, 438, 439, 449
See application file for complete search history.

(56) References Cited

U.S. PATENT DOCUMENTS

| | | | |
|---|---|---|---|
| 7,020,473 B2 | 3/2006 | Splett | |
| 7,065,384 B2 | 6/2006 | Izadpanah | |
| 9,681,360 B1 * | 6/2017 | Salyers | ............... H04W 48/04 |
| 9,730,085 B2 | 8/2017 | Elliott et al. | |

(Continued)

*Primary Examiner* — Kamran Afshar
*Assistant Examiner* — Farideh Madani
(74) *Attorney, Agent, or Firm* — Maynard, Cooper & Gale, P.C.; Brian Sattizahn

(57) ABSTRACT

Embodiments of the present invention provide techniques for registering devices with a distributed antenna system (DAS) and managing access to one or more mobile networks provided through the DAS. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. When a device attempts to connect to the mobile network, an access manager in the DAS can determine whether the device can access the mobile network. Access can be determined based on device registration with the DAS. In various embodiments, different service levels may be made available to different users, devices, types of traffic, etc. by the DAS.

19 Claims, 19 Drawing Sheets

(56) References Cited

U.S. PATENT DOCUMENTS

| | | | |
|---|---|---|---|
| 2008/0177636 A1* | 7/2008 | Yoshida | G06Q 10/107 705/26.35 |
| 2010/0306394 A1* | 12/2010 | Brown | H04L 63/0492 709/229 |
| 2012/0039320 A1 | 2/2012 | Lemson et al. | |
| 2013/0122946 A1* | 5/2013 | Zhu | H04W 48/20 455/500 |
| 2013/0326594 A1* | 12/2013 | Hanson | H04L 63/0853 726/4 |
| 2014/0248852 A1* | 9/2014 | Raleigh | H04M 15/723 455/407 |
| 2015/0019979 A1* | 1/2015 | Alden | H04W 24/02 715/736 |
| 2017/0026382 A1* | 1/2017 | Trigger | H04L 47/70 |
| 2017/0207981 A1* | 7/2017 | Maguire | H04W 24/04 |
| 2017/0238318 A1 | 8/2017 | Lemson et al. | |
| 2017/0359763 A1* | 12/2017 | Pan | H04B 7/04 |

* cited by examiner

TECHNIQUES FOR DEVICE REGISTRATION AND PRIORITIZATION IN A CELLULAR AS A SERVICE ENVIRONMENT

CROSS REFERENCE TO RELATED APPLICATION

This application claims priority to U.S. Provisional Patent Application No. 62/376,907 entitled "TECHNIQUES FOR PROVIDING ACCESS AS AN ADD-ON, ALTERNATE CARRIERS, AND NON-BASE STATION IMPLEMENTATIONS IN A CELLULAR AS A SERVICE ENVIRONMENT," filed Aug. 18, 2016, which is incorporated herein by reference for all purposes. This application also claims priority to U.S. Provisional Patent Application No. 62/376,908 entitled "TECHNIQUES FOR DEVICE REGISTRATION AND PRIORITIZATION IN A CELLULAR AS A SERVICE ENVIRONMENT," filed Aug. 18, 2016, which is incorporated herein by reference for all purposes. This application also claims priority to U.S. Provisional Patent Application No. 62/376,910 entitled "TECHNIQUES FOR MANAGING DEVICE HANDOFF AND ACCESS CONTROL IN A CELLULAR AS A SERVICE ENVIRONMENT," filed Aug. 18, 2016, which is incorporated herein by reference for all purposes. This application also claims priority to U.S. Provisional Patent Application No. 62/376,911 entitled "TECHNIQUES FOR MANAGING BASE STATION UTILIZATION IN A CELLULAR AS A SERVICE ENVIRONMENT," filed Aug. 18, 2016, which is incorporated herein by reference for all purposes.

BACKGROUND

Wireless networking is an increasingly common feature provided by businesses, residential and commercial spaces, municipalities, and other areas. WI-FI and mobile networks enable many common devices, such as desktop computers, laptop computers, smartphones, digital cameras, tablet computers and digital audio players, to communicate with one another, access network resources, connect to other networks, such as the internet, etc. However, modern construction, such as dense commercial and residential buildings, event spaces, and the like, can interfere with mobile networks originating from base stations. This leads to dropped calls, low data rates inside buildings and poor battery life of devices forced to increase transmission power to connect to available mobile networks.

Embodiments of the present invention provide techniques that address these and other problems in network environments.

SUMMARY

Embodiments of the present invention provide techniques for registering devices with a distributed antenna system (DAS) and managing access to one or more mobile networks provided through the DAS. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. For example, where the centralized hub communicates with a remote unit over a fiber optic connection, the remote unit may transduce the signal from an optical signal to an electrical signal before driving the signal over the antenna. When a device attempts to connect to the mobile network, an access manager in the DAS can determine whether the device can access the mobile network. For example, a DAS may be deployed to a residential building and residents are granted access to the mobile network provided through the DAS. Access can be determined based on device registration with the DAS. In various embodiments, different service levels may be made available to different users, devices, types of traffic, etc. by the DAS.

Embodiments of the present invention provide techniques for managing device handoff and access control in a DAS providing one or more mobile networks. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. For example, where the centralized hub communicates with a remote unit over a fiber optic connection, the remote unit may transduce the signal from an optical signal to an electrical signal before driving the signal over the antenna. When a device attempts to connect to the mobile network, an access manager in the DAS can determine whether the device is authorized to access the mobile network. For example, access may be restricted in certain areas of the DAS deployment environment or by certain devices at certain times. In various embodiments, handoff between base stations provided through the DAS and external base stations or access points may be managed by devices or the DAS based on power, performance, cost, or other factors.

Embodiments of the present invention provide techniques for managing base station utilization in a DAS and applying different service models to one or more mobile networks provided through the DAS. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. For example, where the centralized hub communicates with a remote unit over a fiber optic connection, the remote unit may transduce the signal from an optical signal to an electrical signal before driving the signal over the antenna. When a device attempts to connect to the mobile network, current utilization of the mobile network and a current service model can be used to determine whether the device can access the mobile network. For example, a DAS may be deployed to a residential building and residents are guaranteed a quality of service over the mobile network provided through the DAS. If the mobile network is over capacity, the device may be handed off to a base station outside of the DAS deployment environment. In various embodiments, the service model applied to a given DAS deployment may vary depending on e.g., time of day, day of the week, scheduled event, etc. For example, a DAS deployment in an event space may provide free access to any user under one service model, but during a scheduled event under a different service model, each device may be charged an access fee or charged for usage.

Embodiments of the present invention provide techniques for providing network access as an add-on in a DAS. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. For example, where the centralized hub communicates with a remote unit over a fiber optic connection, the remote unit may transduce the signal from an optical signal to an electrical signal before driving the signal over the antenna. Access to a mobile or wireless network provided by the DAS can be granted as an add-on service when a user makes a purchase at a commercial space. When the purchase has been made, an access manager can receive a request to generate an access code which can be returned to the user. When a device attempts to connect to the mobile network, the access can be requested. Once the user has accessed the network using the access code, the user's usage of the network can be monitored and correlated to their transaction history and account data to generate a user profile.

BRIEF DESCRIPTION OF THE DRAWINGS

Various embodiments in accordance with the present disclosure will be described with reference to the drawings, in which.

DETAILED DESCRIPTION

Figure 1:
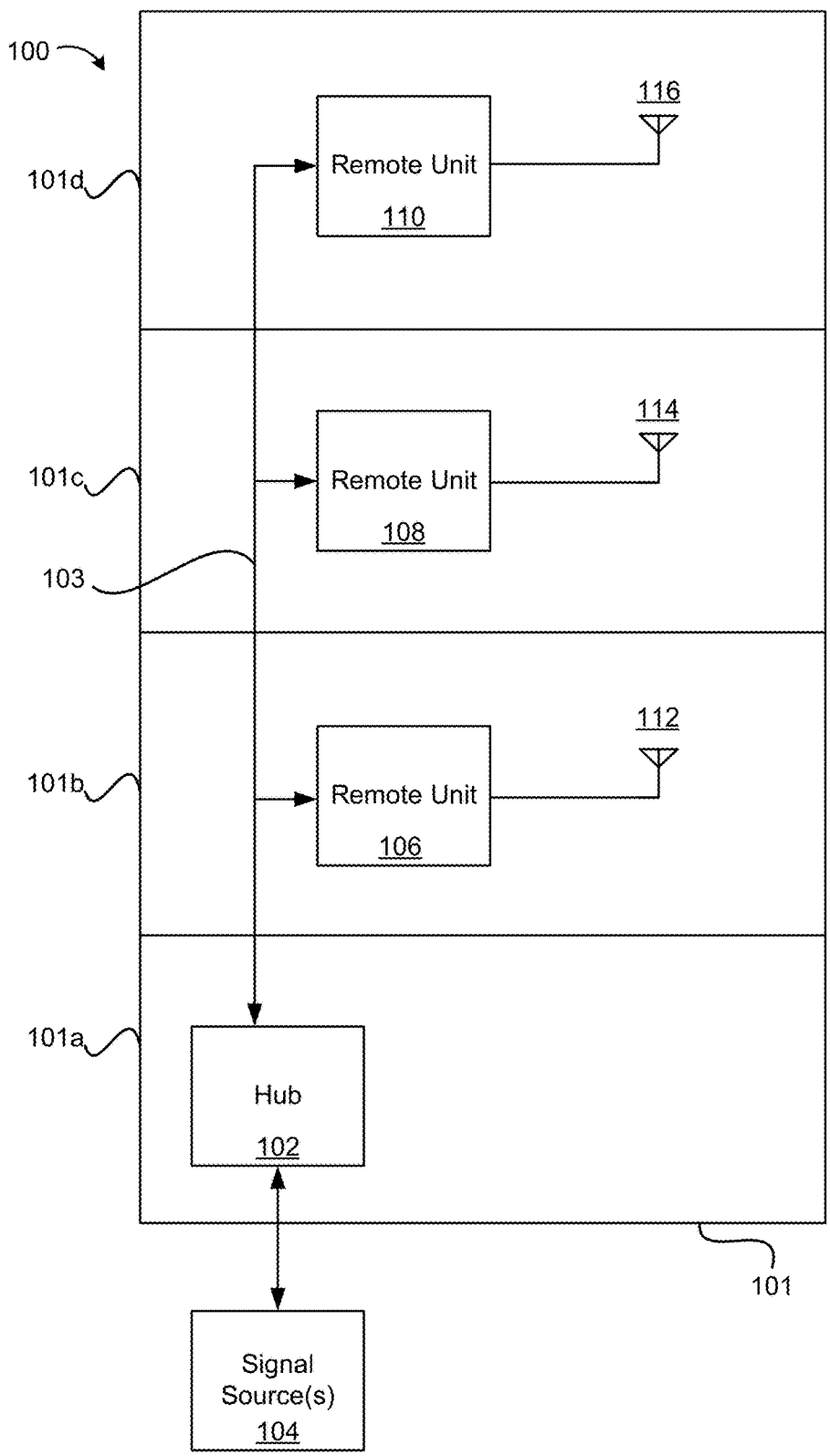
FIG. 1 illustrates an example of a distributed antenna system, in accordance with embodiments of the present invention.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention provide techniques for registering devices with a distributed antenna system (DAS) and managing access to one or more mobile networks provided through the DAS. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. For example, where the centralized hub communicates with a remote unit over a fiber optic connection, the remote unit may transduce the signal from an optical signal to an electrical signal before driving the signal over the antenna. When a device attempts to connect to the mobile network, an access manager in the DAS can determine whether the device can access the mobile network. For example, a DAS may be deployed to a residential building and residents are granted access to the mobile network provided through the DAS. Access can be determined based on device registration with the DAS. In various embodiments, different service levels may be made available to different users, devices, types of traffic, etc. by the DAS.

Embodiments of the present invention provide techniques for managing device handoff and access control in a DAS providing one or more mobile networks. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. For example, where the centralized hub communicates with a remote unit over a fiber optic connection, the remote unit may transduce the signal from an optical signal to an electrical signal before driving the signal over the antenna. When a device attempts to connect to the mobile network, an access manager in the DAS can determine whether the device is authorized to access the mobile network. For example, access may be restricted in certain areas of the DAS deployment environment or by certain devices at certain times. In various embodiments, handoff between base stations provided through the DAS and external base stations or access points may be managed by devices or the DAS based on power, performance, cost, or other factors.

Embodiments of the present invention provide techniques for managing base station utilization in a DAS and applying different service models to one or more mobile networks provided through the DAS. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. For example, where the centralized hub communicates with a remote unit over a fiber optic connection, the remote unit may transduce the signal from an optical signal to an electrical signal before driving the signal over the antenna. When a device attempts to connect to the mobile network, current utilization of the mobile network and a current service model can be used to determine whether the device can access the mobile network. For example, a DAS may be deployed to a residential building and residents are guaranteed a quality of service over the mobile network provided through the DAS. If the mobile network is over capacity, the device may be handed off to a base station outside of the DAS deployment environment. In various embodiments, the service model applied to a given DAS deployment may vary depending on e.g., time of day, day of the week, scheduled event, etc. For example, a DAS deployment in an event space may provide free access to any user under one service model, but during a scheduled event under a different service model, each device may be charged an access fee or charged for usage.

Embodiments of the present invention provide techniques for providing network access as an add-on in a DAS. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. For example, where the centralized hub communicates with a remote unit over a fiber optic connection, the remote unit may transduce the signal from an optical signal to an electrical signal before driving the signal over the antenna. Access to a mobile or wireless network provided by the DAS can be granted as an add-on service when a user makes a purchase at a commercial space. When the purchase has been made, an access manager can receive a request to generate an access code which can be returned to the user. When a device attempts to connect to the mobile network, the access can be requested. Once the user has accessed the network using the access code, the user's usage of the network can be monitored and correlated to their transaction history and account data to generate a user profile.

FIG. 1 illustrates an example of a distributed antenna system (DAS) 100, in accordance with embodiments of the present invention. As shown in FIG. 1, a DAS 100 can be installed in a deployment environment 101, such as a residential, commercial, or office building, an event space, such as a stadium, park, fairgrounds, etc., or any other building or area. In some embodiments deployment environment 101 may include underground or underwater spaces, movable spaces, such as airplanes, ships, space stations, etc. The DAS may be deployed across a number of zones, such as floors 101*a*-101*d*, of the deployment environment. Although four zones are shown in FIG. 1 arranged as floors in a residential or office building, more or fewer zones may also be present in a deployment environment, which may be arranged in various configurations depending on the deployment environment.

As shown in FIG. 1, in some embodiments DAS 100 can include at least one hub 102. Hub 102 can be configured to receive signals from, and transmit signals to, one or more signal sources 104, such as mobile phone base stations, wired or wireless Internet or LANs, or other signals. Hub 102 can transmit data from the one or more signal sources 104 to each zone using remote units 106, 108, 110. In some embodiments, hub 102 can be connected to each remote unit 106, 108, 110 through fiber optic cables. Alternatively, coaxial or other transmission line may be used to connect hub 102 to remote units 106, 108, 110. In some embodiments, hub 102 can be configured to receive signals from one or more client devices that connect to DAS 100 through antennas 112, 114, 116. Each antenna may include active elements electrically connected to the transmission line, and passive elements such as stubs. Although single lines are shown connecting the components of DAS 100, in various embodiments separate transmit and receive lines may be maintained depending on deployment.

In various embodiments, DAS 100 may provide service to multiple client devices. The client devices may include personal computers, cell phones, handheld messaging devices, laptop computers, set-top boxes, personal data assistants, and any other suitable devices configured to send and receive information over a network. Although embodiments of the present invention are described herein with respect to cellular networks generally, the DAS can support any appropriate signal source, including an intranet, the Internet, a local area network, a wireless local area network (WLAN) implemented using devices that support the IEEE 802.11 family of specifications, or any other such network or combination thereof. Components used for such a system can depend at least in part upon the type of network and/or environment selected. Protocols and components for communicating via such a network are well known and will not be discussed herein in detail.

In the example shown in FIG. 1, deployment environment 101 is a building, having a first floor 101*a* and three additional floors 101*b*, 101*c*, 101*d*. Hub 102 can be installed in the first floor 101*a* (e.g., a basement, lobby, or other floor where space may be less of a premium). One or more fiber optic lines 103 can connect hub 102 to remote units 106, 108, 110 deployed to floors 101*b*, 101*c*, 101*d*, respectively. In some embodiments, fiber optic lines 103 can include multimode fiber optic lines configured to carry optical signals modulated onto carrier signals, enabling multiple services to be provided without additional down-conversion. In various embodiments, a connector bank may be used to connect fiber optic lines 103 to hub 102, enabling connections to be added or removed as needed for a given deployment. For example, in FIG. 1, hub 102 may have three hub connectors that connect hub 102 to a connector bank which connect to three fiber optic lines running to floors 101*b*, 101*c*, and 101*d*. In some embodiments, fiber optic lines 103 may be run along a vertical riser to each floor. At each floor the line may be connected to one or more telecommunications outlets where one or more additional DAS components may be connected to the fiber optic line 103. In various embodiments, DAS components may be connected to the fiber optic lines using pluggable connectors, splices, or other connections or combinations of connections.

Although one antenna is shown deployed to each floor, this is for simplicity of depiction and explanation. The number and location of antennas deployed to a given zone (e.g., floor) may vary depending on the deployment environment (e.g., indoor/outdoor placement, height, local physical obstructions, etc.), anticipated usage, antenna type, power output, and local interference (e.g., from other devices operating in the same frequency range).

In some embodiments, hub 102 is connected to receive input signals from, and to provide output signals to one or more signal sources 104. Signal source 104 can include an access point that provides access to various network resources, such as a wired LAN, one or more local or remote servers, data stores, and other resources. Additionally or alternatively, signal source 104 can include one or more base stations that provide a wireless telephone system, such as GSM, CDMA, etc. Digital signals sent by the signal source can be converted to optical signals to be transmitted on fiber optic lines 103 to the remote units. For example, in some embodiments, remote units 106, 108, 110 may include an electro-optical transducer module, which may include a photodiode to convert downlink optical signals received from hub 102 over fiber optic lines 103 into electrical signals to be transmitted using antennas 112, 114, 116. The transducer module may also include a laser to convert uplink electrical signals received from antennas 112, 114, 116 into optical signals to be sent to hub 102 over fiber optic lines 103.

Remote units 106, 108, 110 may further include additional electronics modules configured to modulate/demodulate the electrical and optical signals as needed as well as to drive the transducer module. In some embodiments, digital to optical conversion can include modulating a carrier signal with the digital signals received from the signal source before transducing the modulating signal using a photoelectric transducer. Each remote unit 106, 108, 110 can receive the modulated signal over fiber optic lines 103. The remote units may include a photoelectric transducer to convert the modulated signal from the received optical signal to a modulated digital signal. The remote units can demodulate the signal as needed from the carrier signal used for optical propagation and can be modulated using a carrier signal for wireless transmission. The signal received from the signal source may then be transmitted on each floor using antennas 112, 114, 116.

Similarly, each antenna 112, 114, 116 may receive signals from devices located within each antenna's coverage area to connect to the signal source 104. For example, where the signal source is a cellular base station, cellular devices may connect to that base station over the DAS. Signals from the cellular devices can be received by the antennas, converted to optical signals to be transmitted down transmission lines 103, converted back by hub 102 before being sent to the base station 104. As such, using the DAS, cellular service can be made available in spaces that may otherwise experience poor coverage, such as due to the characteristics of the building (e.g., layout, materials, etc.), the location of the deployment environment (e.g., underground, at sea, in a remote area, etc.), etc.

In various embodiments, the DAS may provide network management tools that enable services to be provided to users of the DAS that are in addition to those provided by a network provider (e.g., a cellular network provider, Internet service provider, or other service provider associated with a signal source 104). As discussed below with respect to FIG. 2 an access manager may be used with the DAS in various embodiments.

Figure 2:
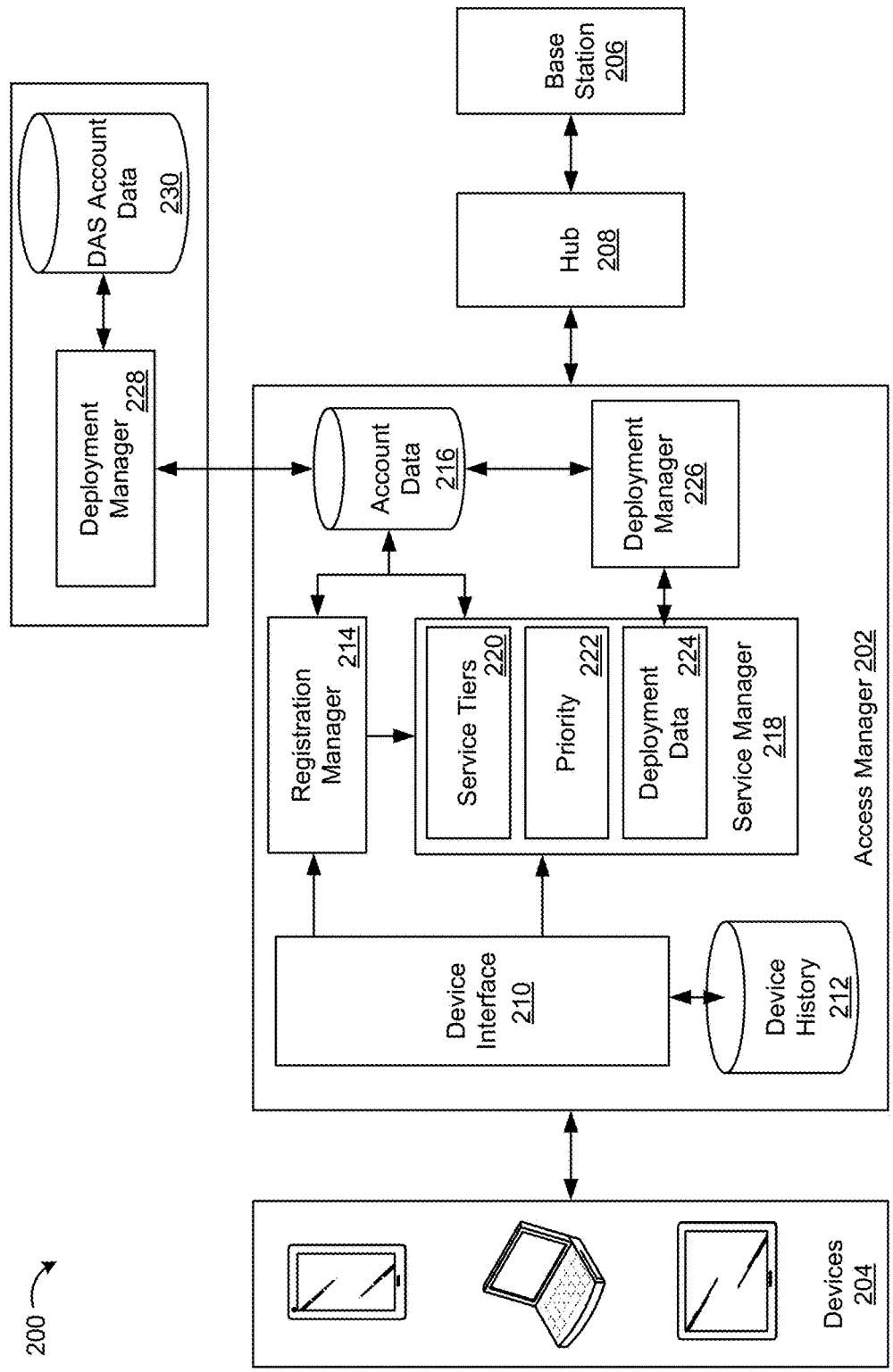
FIG. 2 illustrates a system that controls access to cellular networks, in accordance with an embodiment of the present invention.

FIG. 2 illustrates a system 200 that controls access to cellular networks, in accordance with an embodiment of the present invention. As shown in FIG. 2, an access manager 202 can be provided to manage access by devices 204 to a cellular network provided by base station 206 through hub 208. Although access manager 202 is illustrated as a distinct entity from base station 206 or hub 208, this is for simplicity of explanation and illustration and not intended to be limiting. One of ordinary skill in the art would recognize that the functionality described herein could be incorporated into, or distributed across, hub 208 and one or more base stations 206 in various configurations.

As shown in FIG. 2, when a device attempts to connect to a cellular network in a DAS deployment, the device can be connected to access manager 202. Access manager 202 can include a device interface 210 that can be configured to communicate with various types of devices 204. In some embodiments, upon connection, device interface 210 can query connected devices for device information including, but not limited to, device phone number, MAC address, mobile identification number, mobile subscription identification number, International Mobile Subscriber Identity (IMSI), Mobile Station International Subscriber Directory Number (MSISDN), or other identifier. In some embodiments, device interface 210 can gather additional device information such as device type, operating system, manufacturer, model number, etc. Device information can be stored in a device history 212 that may be used to determine how often particular devices connect to the access manager.

In some embodiments, access manager 202 can limit access to devices that are registered with the access manager 202. As discussed above, DAS installations may be deployed in residential or commercial spaces, event spaces, etc. Users who have access to these spaces, such as event-goers, residents, tenants, employees, etc., may register their devices with access manager 202 to gain access to the cellular network provided by base station 206. When a device connects, the device interface can determine based on the device information whether that device is registered. If not, registration manager 214 can cause a registration interface to be displayed on the device. During registration a user may be asked to provide identity information (e.g., name, address, phone number, employee identifier, etc.) and/or access information (e.g., an access code, guest information, visitor details, itinerary, ticket identifier, etc.). Registration manager 214 can determine whether the user qualifies for access to the cellular network (e.g., is the user a resident or guest of the building where the DAS is deployed? does the user have a ticket to an event where the DAS is deployed, etc.). If authorized, registration manager 214 can create a user account that is associated with the user's device information and store the user account in account data 216.

In some embodiments, a passive user registration process can be performed based on frequency of contact with a device. For example, based on device history 212 and deployment information (e.g., location where the DAS is deployed, etc.), it may be determined that devices that are frequently present during particular times can be registered with the access manager. For example, devices that are regularly present on weekday nights and weekends in a residential deployment can be determined to be residents and granted access. Similarly, devices that are regularly present in a commercial deployment during weekdays may be determined to be employees or tenants and granted access. In some embodiments, in addition to device information, signal strength may be used to determine whether the devices are attempting to connect from within a deployment area and not from outside of it. For example, this enables the system to distinguish between tenants in a building and devices that are nearby, but external to the building, such as those carried by neighbors, pedestrians, drivers, and/or integrated into nearby vehicles, internet of things (IoT) devices, etc.

As shown in FIG. 2, service manager 218 can determine the service available to a registered user. For example, registered devices can receive particular service levels, such as quality of service (QoS) guaranteed by the DAS deployment, and/or differentiated service levels based on device type, user information, or other data. In some embodiments, various service tiers 220 can be made available by the DAS. The service tiers may include guarantees on data transmission rates, service availability (e.g., up time), number of dropped calls, etc. Where registration is linked to a user identity, some users may receive higher priority service than others. For example, in a deployment on a business campus, the CEO or other executive members may receive a higher service tier while other employees may receive a lower service tier. Similarly, employees attached to a higher value project may receive a higher service tier than other employees.

In some embodiments, each device may be associated with a priority level 222 which may enable that device to receive enhanced service. For example, a device with a high priority may be provided service even if it requires a low priority device to be dropped from the network temporarily. Priority data 222 may also provide users with temporary access to higher service tiers 220. In some embodiments, users may be charged for priority access or to increase their service tier. In some embodiments, connections associated with particular devices or particular bands may be associated with a priority level. For example, communications originating from a medical device may be given a higher priority to ensure a connection is made as quickly as possible. Similarly, devices communicating over emergency frequencies may be given higher priorities. In some embodiments, priority data 222 may be associated with one or more rules that determine how data associated with that priority level should be routed. For example, a medical device may be associated with priority data that indicates a destination server to which all traffic originating from the device should be sent (e.g., a server associated with the medical device manufacturer or service provider).

In some embodiments, registration may enable access to multiple DAS deployments. As shown in FIG. 2, service manager 218 can include deployment data 224 which may include an identifier associated with the DAS deployment or with an association of DAS deployments, providers, building operators, business operators, or other groups. For example, on a university or commercial campus, registration with a DAS deployment in one building may provide access without reregistration or logging in to other buildings on campus. Similarly, registration with a business, such as a store, restaurant, or other entity, that provides cellular access as a service at their locations, may provide access at every location (e.g., register at one franchise location and gain access at all franchise locations). A deployment manager 226 can determine whether a given device can access the DAS deployment based on account data 216 associated with that device and the deployment data. In some embodiments, the account data may be regularly updated by a remote deployment manager 228 that updates account information across a network of DAS deployments. When a new user registers with an access manager that is part of a network of deployments, the resulting account data can be sent to a remote deployment manager 228 which stores the account data in a remote DAS account data store 230. Periodically, the remote deployment manager 228 can update account data in each associated DAS deployment, providing access to devices across deployments without requiring multiple registration events.

Figure 3:
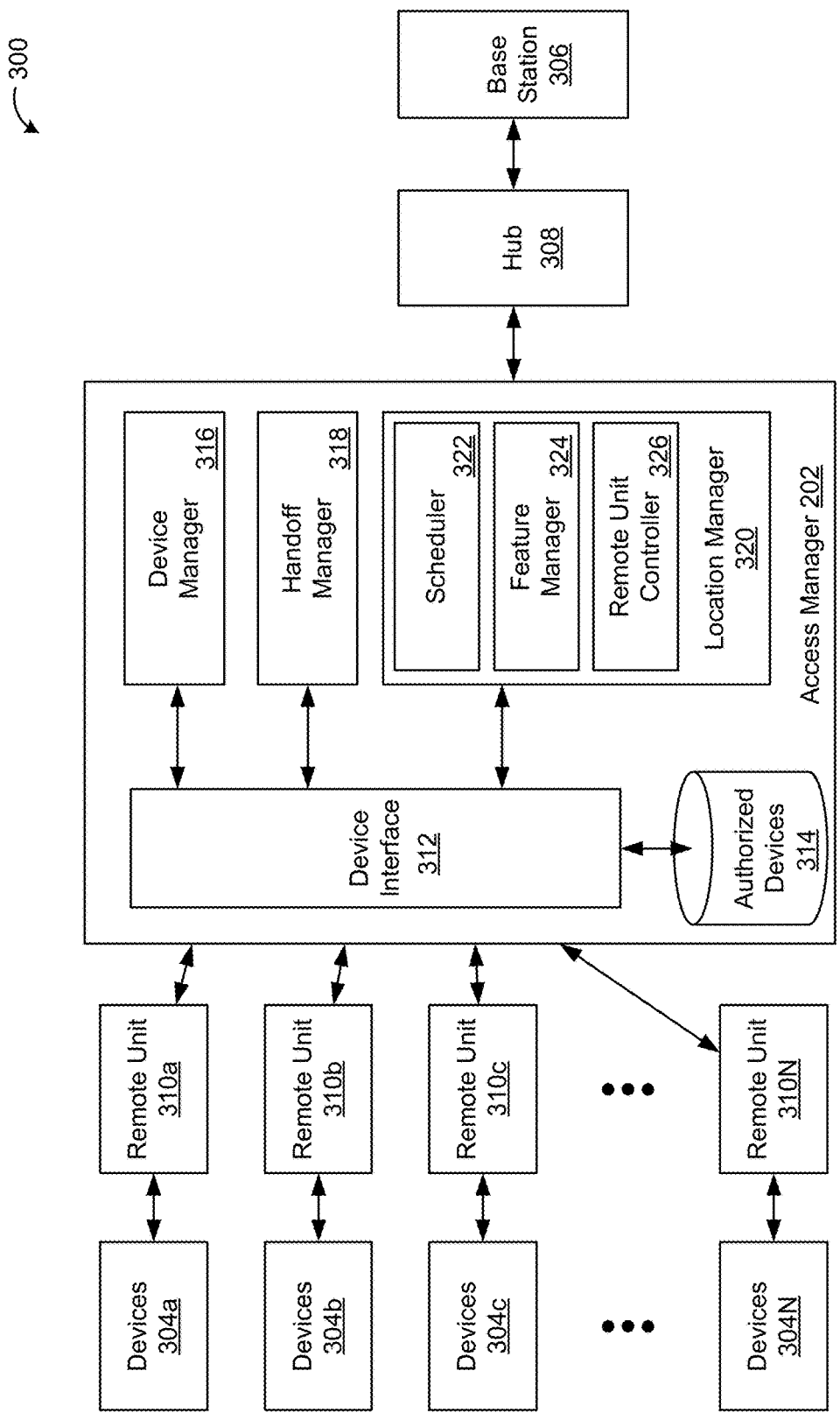
FIG. 3 illustrates a system that controls access to cellular networks, in accordance with an embodiment of the present invention.

As shown in FIG. 3, when a device attempts to connect to a cellular network in a DAS deployment, the device can be connected to access manager 202. Access manager 202 can include a device interface 312 that can be configured to communicate with various types of devices 304a-304N. In some embodiments, upon connection, device interface 310 can query connected devices for device information including, but not limited to, device phone number, MAC address, mobile identification number, mobile subscription identification number, International Mobile Subscriber Identity (IMSI), Mobile Station International Subscriber Directory Number (MSISDN), or other identifier. In some embodiments, device information can include one or more of device type, operating system, manufacturer, model number, etc. Device information can be compared to device information associated with authorized devices 314 to determine whether to allow access to the device.

In some embodiments, a device manager can authorize devices that are registered with the DAS. DAS installations may be deployed in residential or commercial spaces, event spaces, etc. Users who have access to these spaces, such as eventgoers, residents, tenants, employees, etc., may register their devices with access manager 202 to gain access to the cellular network provided by base station 306. After a device has been registered, device manager 316 can send a message to the device (e.g., a ping or query). The message can request device details and/or confirm functionality of the device. By confirming the device information, the device can be authorized. Similarly, by confirming the functionality of the device, the access manager can determine that the device is a cellular device as it is asserted to be and not a dummy device being smuggled into a building or event. For example, a text message (e.g., SMS) can be sent to the device with a code and a number to which to respond. Additionally, or alternatively, a code sent to the device via the cellular network can be submitted through a web interface to confirm functionality of the device. Once authorized, the device details can be added to authorized devices data store 314, enabling the device to access the cellular network through the DAS. As discussed further below, authorized device data store 314 may maintain authorized lists for the entire DAS deployment, and/or for each individual remote unit or groups of remote units.

In some embodiments, handoff manager 318 can determine whether to enable a device to connect to base station 306 through the DAS, or to offload the device to an external base station, or other wireless network access point. This may be useful when a user has recently entered a DAS deployment environment and multiple base stations and access points are available to the user. For example, when a user is arriving to a new area by ship, the arrival port may be a DAS deployment environment but there may also be base station towers in the general area. Similarly, in a mixed use building a shop on the ground level may provide a Wi-Fi access point while the residential floors above are a DAS deployment environment, leading to an overlap between the Wi-Fi coverage area and the DAS coverage area. In some embodiments, handoff manager 318 can monitor power levels of communications received from a device and enable the device to connect to base station 306 if there is a power savings opportunity for the device (e.g., if less power would be required to connect through the DAS than through an external base station. Additionally, or alternatively, handoff manager may monitor data transmission rates of available networks and enable access through the DAS where it provides the greatest transmission rate. In some embodiments, handoff manager 318 may cause the DAS to appear to a device to have the device's preferred signal characteristics (e.g., highest power of available base stations, or other characteristic) so that the device does not attempt to connect to a different base station on its own.

In some embodiments, location manager 320 can provide and/or block access at particular locations in a deployment environment. Location manager 320 can include a scheduler 322 that enables access to be provided or blocked at various locations. For example, scheduler 322 can provide a user interface accessible to a user, such as an administrator, building operator, IT manager, etc. Using the scheduler 322, access can be managed across a deployment environment, including access times, authorized devices during the access times, etc. For example, in a university deployment, access may be disabled to a classroom during an exam, limiting the ability of students to cheat using their mobile devices. Similarly, access may be restricted at events, such as boxing matches, concerts, at a speech, or other events. In some embodiments, access may be disabled or enabled for specific devices. For example, during the exam, the instructor's mobile device may be able to connect to the cellular network, while student devices receive no service. In some embodiments, entries corresponding to the instructor's mobile device in authorized devices data store 314 can be updated temporarily with flag to continue providing access when connecting through one or more remote units associated with the disabled location, while other device entries are updated with temporary information indicating that the devices are not authorized for those remote units. In some embodiments, scheduler 322 can disable remote units or groups of remote units along a predefined route. For example, a secure route may be established for a government official or other important person to disable or restrict cellular connections along the route (e.g., by disabling or restricting access to remote units along the predefined route). After the time period set for restriction using scheduler 322, access may be restored, e.g., by removing the temporary information from the device entries in authorized device data store 314.

As shown in FIG. 3, location manager 320 can include feature manager 324 which enables specific features to enabled or disabled at particular locations. For example, voice calling may be disabled in libraries while data access remains enabled. Likewise, data access may be restricted in areas to prevent images, video, or other data from being transmitted outside of the area, while voice calls may remain unrestricted. In various embodiments, remote unit controller 326 can use the schedule and feature settings from scheduler 322 and feature manager 324 to identify and disable or restrict access to specific remote units. For example, remote unit controller may cause a user interface to be displayed that maps locations of remote units in a deployment environment. For example, the user interface may overlay remote unit locations over a floor map of the deployment environment. In some embodiments, descriptions of locations corresponding to each remote unit may be provided (e.g., Remote Unit 310a located at Auditorium X or Remote Unit 310b located on Floor 15, etc.).

Figure 4:
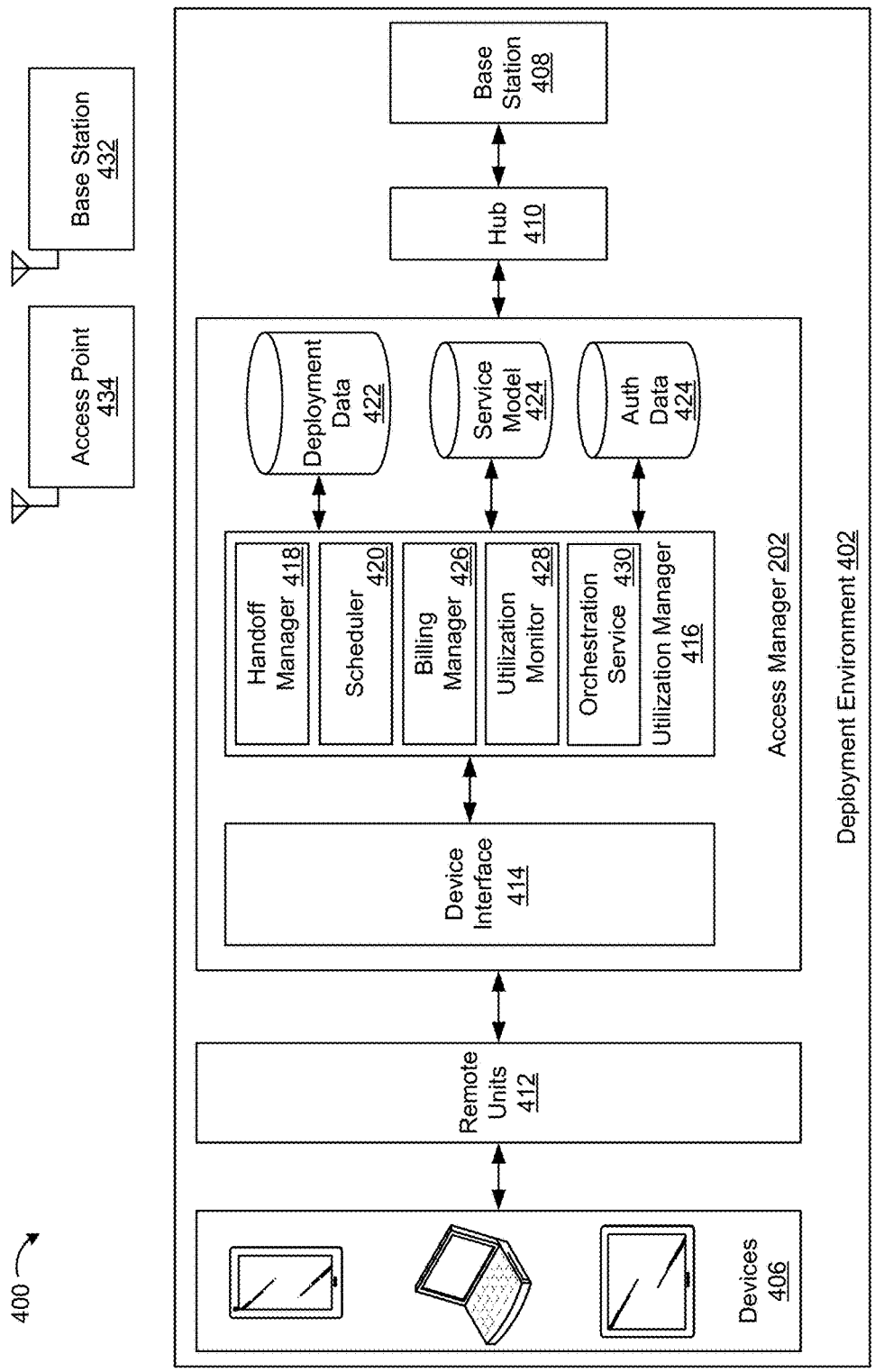
FIG. 4 illustrates a system that manages utilization across base stations, in accordance with an embodiment of the present invention.

As shown in FIG. 4, when a device attempts to connect to a cellular network in a DAS deployment, the device can be connected to access manager 202. Access manager 202 can include a device interface 410 that can be configured to communicate with various types of devices 406. In some embodiments, upon connection, device interface 414 can query connected devices for device information including, but not limited to, device phone number, MAC address, mobile identification number, mobile subscription identification number, International Mobile Subscriber Identity (IMSI), Mobile Station International Subscriber Directory Number (MSISDN), or other identifier. In some embodiments, device interface 414 can gather additional device information such as device type, operating system, manufacturer, model number, etc.

In various embodiments, utilization manager 416 can monitor usage of the cellular network by the devices and determine how to allocate available capacity. Different DAS deployments may quantify utilization in different ways, for example, by number of devices connected, amount of data transferred, call time, etc. Excess capacity (e.g., where the cellular network can more than handle the existing load generated by currently connected devices) can be reallocated to other devices or to a network provider. An overutilization of the network can lead to poor quality of service, dropped calls, slow data transfers etc. In some embodiments, handoff manager 418 can monitor activity on a per device basis, e.g., using the device identifiers determined by device interface 414. Devices may be selectively handed-off to other base stations or access points based on their activity to reduce overcapacity.

In some embodiments, scheduler 420 can be used to determine when different service models are used for a given DAS deployment. As discussed, different service models may be applied in different DAS deployments. Each deployment may be associated with deployment data 422 that describes a type of deployment (commercial, residential, event, individual, etc.) for the DAS and associates the deployment with one or more service models 424. For example, a deployment in a commercial or residential building may apply a service model that provides a guaranteed quality of service (QoS) level during specific hours (e.g., business hours in a commercial space, nights and weekends in a residential space). A DAS provider may be able to charge a set rate for each device connected while the QoS is maintained and may allocate capacity to maximize the number of devices connected while maintaining QoS.

In some embodiments, scheduler 418 can apply different service models 424 to a deployment at different times. For example, a deployment in an event space may use one service model during an event and a different service model during other times. During an event, DAS power may be reduced to limit DAS coverage to the deployment environment. As devices connect, each device may be individually charged for access to the network provided by the DAS. Outside of an event, DAS power may be increased, to extend coverage beyond the deployment environment. Devices outside the deployment environment may be charged a flat fee for connecting to the network provided by the DAS. In some embodiments, excess capacity may be sold or auctioned to a cellular network provider and the DAS may act as any other base station used by the cellular network provider.

In some embodiments, billing manager 426 can bill users in terms of utilization. For example, utilization monitor 428 can monitor overall utilization of the mobile and or wireless networks provided by the DAS and may monitor individual device activity. This may include type of activity (e.g., data, voice, VoIP, VoWiFi, video streaming, etc.) and amount of usage in minutes, kilobytes, number of devices connected, or other metric. The utilization of the network can be used to determine whether to enable access to a new device. For example, if the network is already over capacity, the new device may be handed-off to a different base station, such as one outside the deployment environment. Billing manager 426 can determine an amount to bill based on the utilization determined by the utilization monitor and the service model being applied at the time. For example, the service model may define a cost per minute or cost per kilobyte which may be combined with the utilization to determine a total cost. In some embodiments, a flat fee per device may be charged. As used herein, user may refer to the end user of the user device, an operator of the deployment environment (such as a building manager, IT department, etc.) or any combination thereof. Billing manager 426 can charge the customer using payment data (e.g., payment card number, or various electronic payment methods as are known in the art). Billing manager 426 may manage one time and recurring payments.

In some embodiments, the service model 424 can define services or features that may be used at reduced or no cost when accessed through the DAS. For example, voice calls may be provided without impacting available minutes a device has. Additionally, or alternatively, data rates may be reduced when accessed over the DAS. In some embodiments, in addition to base station 408, a Wi-Fi access point may provide Wi-Fi coverage through hub 410. Accordingly, based on current service model incentives, and user activity determined by utilization monitor 428, handoff manager 418 may cause devices to connect to the wireless or mobile network that reduces costs for the user. In some embodiments, handoff manager 418 can increase utilization of internal base station relative to external base stations 432 or access points 434 outside of the deployment environment 402 based on the service model 424 and type of activity being performed as determined by utilization monitor 428.

In some embodiments, orchestration manager 430 can receive a service request. In various embodiments, the service request may include a request to establish, extend, or cancel service for a deployment environment and/or for particular devices 406 within the deployment environment 402. For example, when a request is received to establish service, the orchestration manager can conduct a payment transaction for the requested service and, once approved, provision the requested service, register a device or devices to receive the service, authorize the device or devices, and orchestrate any other systems as necessary to perform the requested service action. In some embodiments, biometric data or other authorization and/or authentication data may be received with a service request. The biometric data can be compared to authorization and/or authentication data 424 stored locally or by an authentication service to determine if the user is authorized to perform a payment transaction. In some embodiments, the biometric data can be included with a request to perform the payment transaction and/or the results of authentication of the biometric data can be provided with the request to perform the payment transaction to be used by a payment processor during authorization.

Figure 5:
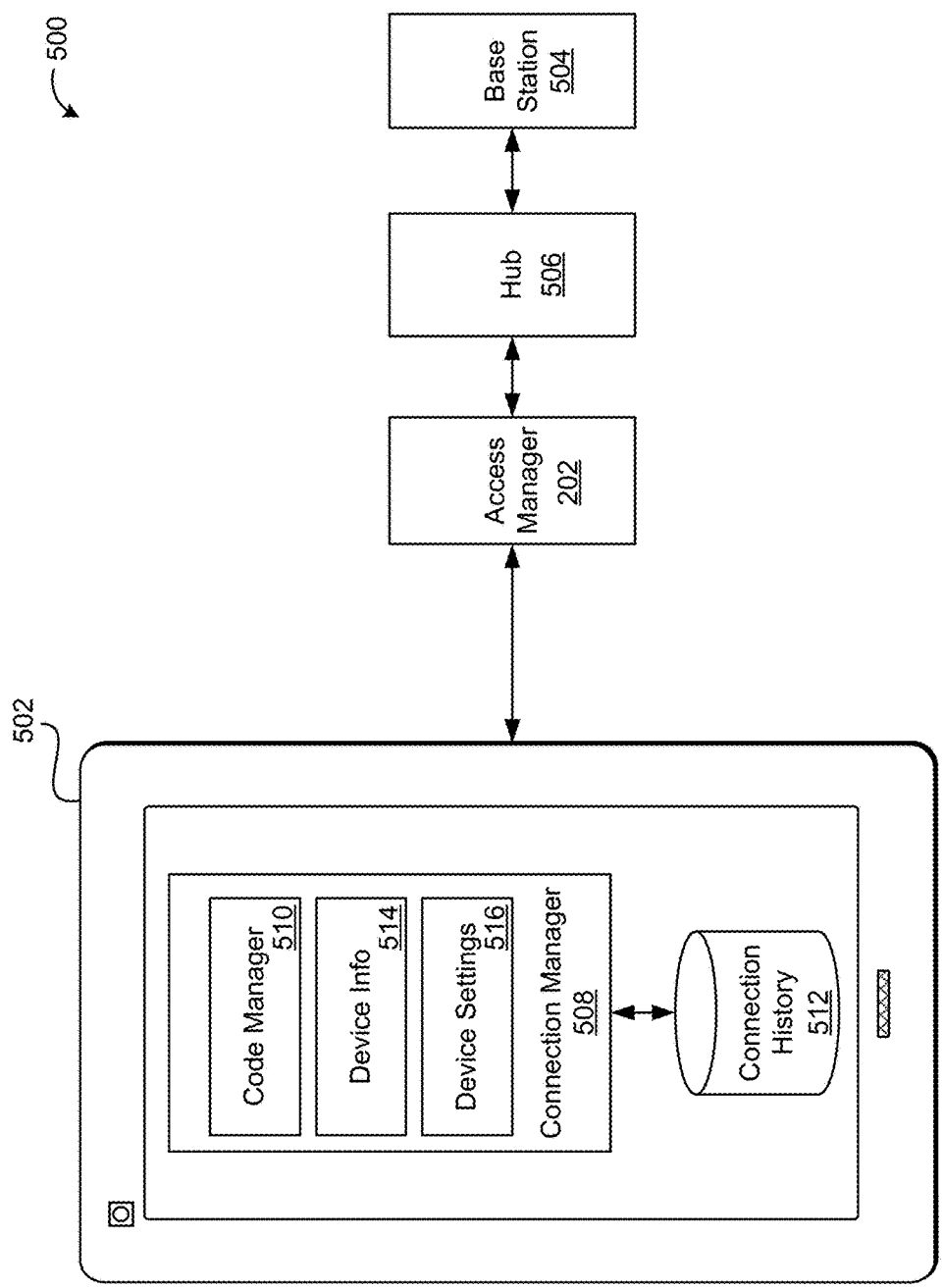
FIG. 5 illustrates a system that controls access to cellular networks, in accordance with an embodiment of the present invention.

FIG. 5 illustrates a system 500 that controls access to cellular networks, in accordance with an embodiment of the present invention. As shown in FIG. 5, a mobile device 502, such as a mobile phone, tablet computer, or other device capable of communicating over a cellular network, can connect to a cellular network provided by a base station 504 through a hub 506 of a DAS deployment. In various embodiments, multiple base stations in addition to base station 504 associated with the DAS deployment may be detected by the mobile device. For example, base stations external to the deployment, such as tower base stations, small cell base stations, and other base stations may be detectable by the mobile device. Each base station may be associated with a different "code" or base station identifier (such as a system identification number). Mobile device 502 may include a connection manager 508 monitor available base stations and preferentially connect to the base station 504 associated with the DAS.

In some embodiments, a code manager 510 can keep track of which base stations the mobile device connects to each day. If the mobile device connects to the same base station regularly, such as base station 504 while the user is at home or at work in a DAS deployment environment, the code manager can identify that base station as the mobile device's home or preferred base station. In various embodiments, the base stations and time of connection can be stored in connection history 512. As discussed above, device 502 may include device information 514 that may be provided to the access manager 202, including, but not limited to, device phone number, MAC address, mobile identification number, mobile subscription identification number, International Mobile Subscriber Identity (IMSI), Mobile Station International Subscriber Directory Number (MSISDN), or other identifier. In some embodiments, device information can additionally, or alternatively, include any of device type, operating system, manufacturer, model number, etc. In some embodiments, device settings 516 can include changes to the operation of mobile device 502 when connected to a mobile network through the access manager 202 and hub 506 of the DAS. For example, if the mobile device is plugged in and connected to base station 504, the mobile device may be kept in a higher power state, enabling notifications to be more quickly displayed or alerted.

Figure 6:
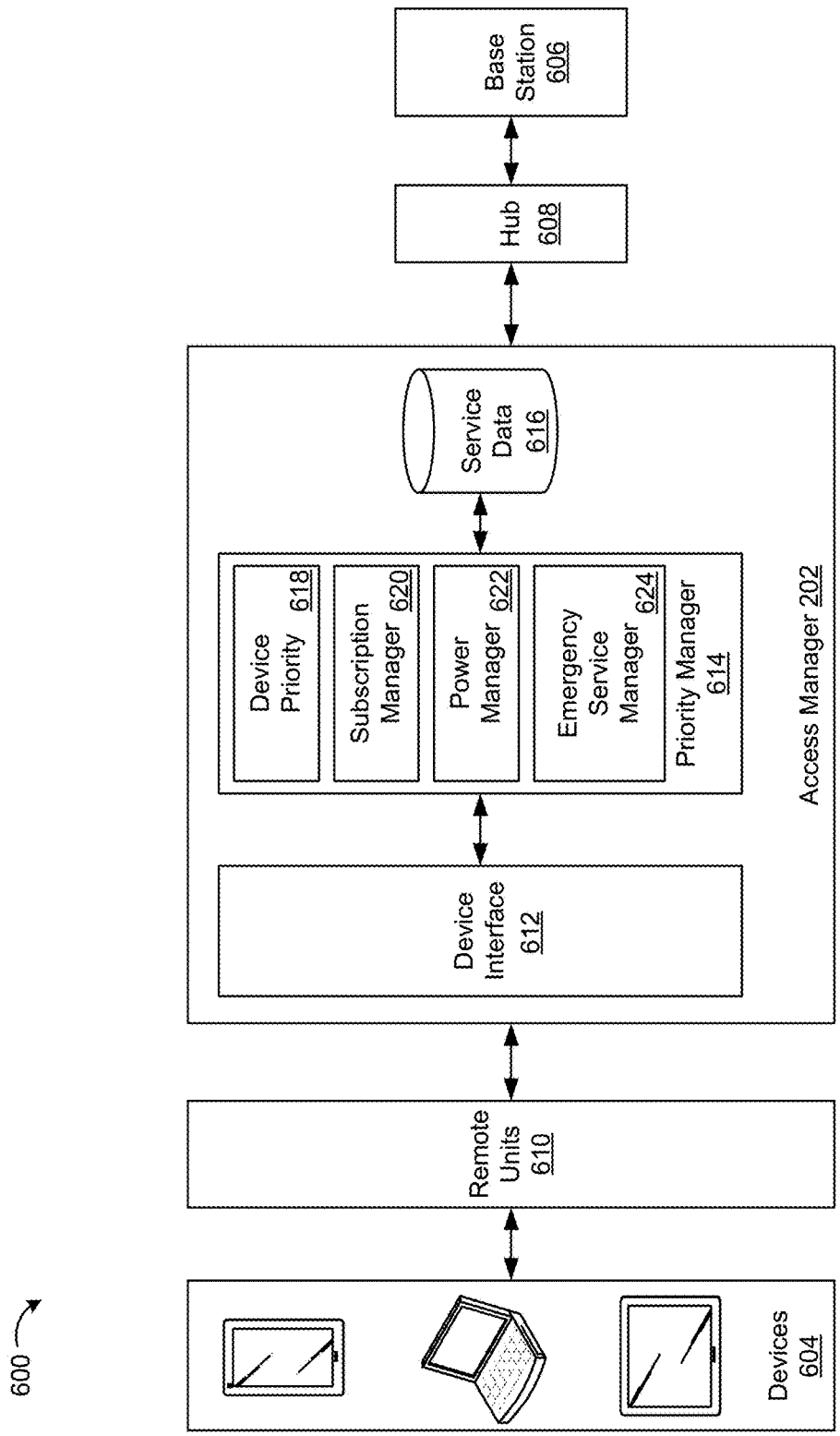
FIG. 6 illustrates a system that prioritizes and reallocates access to cellular networks, in accordance with an embodiment of the present invention.

FIG. 6 illustrates a system 600 that prioritizes and reallocates access to cellular networks, in accordance with an embodiment of the present invention. As shown in FIG. 6, access manager 202 can enable various devices 604 to connect to a cellular network provided by base station 606 through a DAS system including a hub 608 and one or more remote units 610. In various embodiments, devices 604 may include mobile phones, tablet computers, or other devices capable of communicating over a cellular network. Hub 608 may be connected to multiple base stations in addition to base station 606. For example, base stations associated with different service providers may be connected to hub 608, providing multiple cellular networks in the deployment environment through the DAS.

As discussed above, a DAS may be deployed in a commercial or residential building, event space, or other deployment environment. Such deployment may be associated with a service contract that provides cellular or other services over a set period of time, which may be defined in service data 616. Outside of that arrangement (e.g., upon expiration of such a contract), services may be provided to various users in various ways. In some embodiments, each device may be associated with a device priority 618 which may determine whether that device can receive service. For example, upon expiration of a DAS service contract, devices that previously had a high priority may be assigned a low priority, and service may be opened to additional devices (e.g., nonresidents, nontenants, neighbors, etc.). By increasing the priority of new devices, users previously covered by the service contract may receive comparatively poorer service. Similarly, such previously authorized devices may become unauthorized, cutting off service to these devices. In some embodiments, emergency service may be maintained for all devices, regardless of priority level or prior status.

In some embodiments, subscription manager 620 may enable users to subscribe to service through the DAS independently of building management or any other entity that was previously responsible for managing service under the expired contract. When users subscribe, service data 616 may be updated to reflect the new level of service. Additionally, or alternatively, device priority associated with the user's devices may be updated to reflect the new service arrangement. In some embodiments, users outside of the deployment environment may also be able to purchase service access through the DAS. Power manager 622 can increase the transmit power of the DAS to extend its range outside of the deployment environment, improving the range and performance of such connections to users not resident within the deployment environment. In some embodiments, if the base station 606 has additional capacity that is not being utilized through the DAS, that capacity may be auctioned to other nearby users or facilities or the capacity may be sold back to the network.

In some embodiments, emergency service manager 624 can enable data to be sent to specific devices and/or specific locations in the DAS. In some embodiments, emergency service manager 624 can send data to specific authorized devices 604. For example, during authorization, it may be determined whether the device belongs to emergency service personnel or other users having emergency training. If an emergency is detected in the deployment area, messages, instructions, or other data can be automatically sent to the devices associated with those users. In some embodiments, data may be sent to all devices near the identified emergency conditions, for example to all devices connected to particular remote units.

Figure 7:
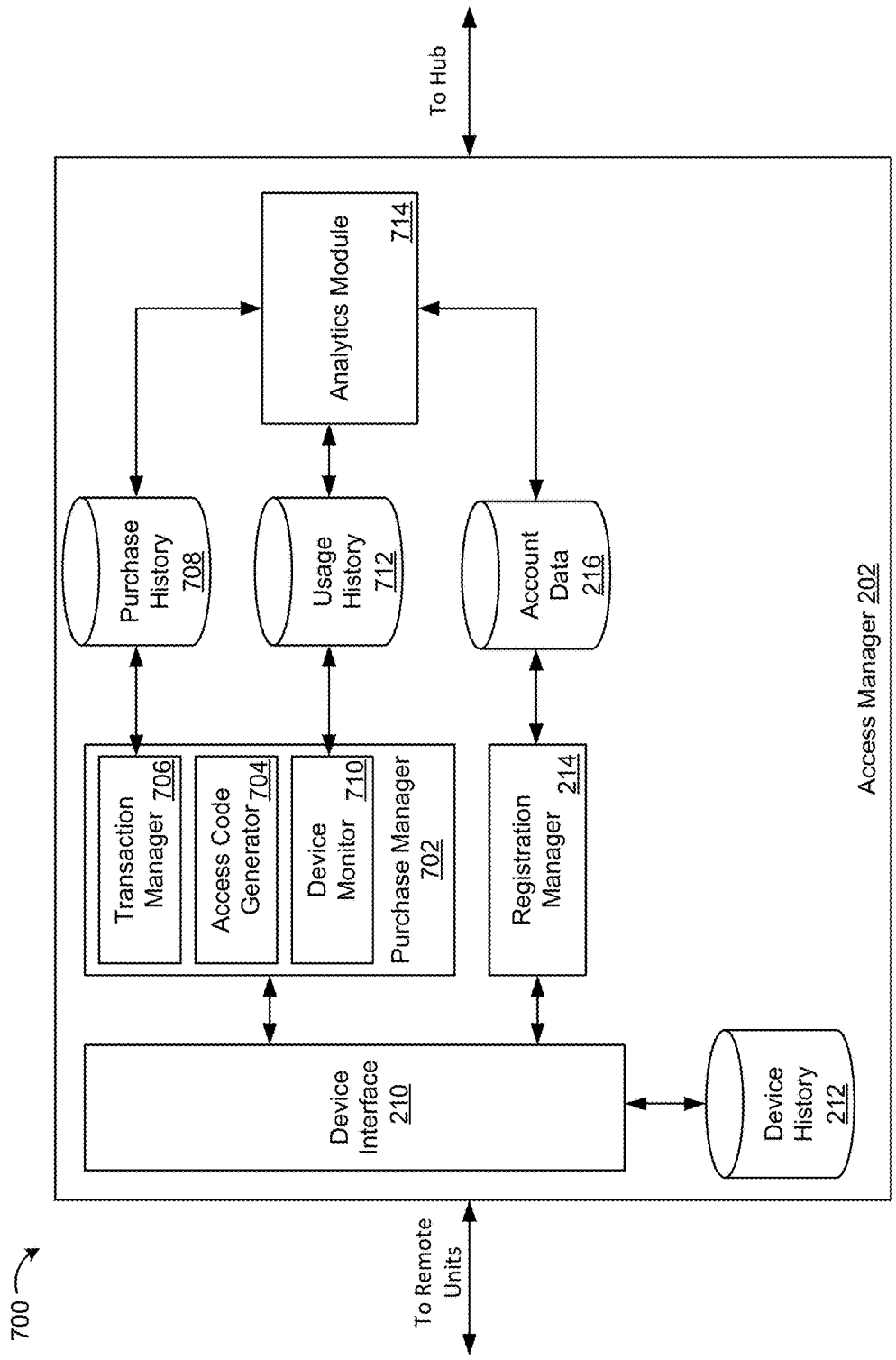
FIG. 7 illustrates a system that provides cellular service as an add-on, in accordance with an embodiment of the present invention.

FIG. 7 illustrates a system 700 that provides cellular service as an add-on, in accordance with an embodiment of the present invention. As discussed above, access manager 202 can collect device data 212 and account data 216 when users access a network provided through the DAS deployment. Additionally, as discussed above, such DAS deployments may be in commercial spaces, such as coffee shops, restaurants, large retail stores, etc. When customers visit such locations, network access may be provided as an add-on service after making a purchase. In some embodiments, access manager 202 may include a purchase manager 702. When a customer makes a purchase, a merchant point of sale terminal may send a request to the purchase manager for a network access code. Access code generator 704 may then generate a code, such as a random number, an arbitrary customer identifier, etc., and return the code to the point of sale terminal. The access code may be sent to the user, e.g., by being printed on a physical ticket (such as a receipt) or being electronically communicated to the user such as by email or SMS if the user has provided contact information. In some embodiments, an access code may be generated when a user purchases a ticket to an event, such as a concert, baseball game, or other event. The access code may be associated with a time period during which it is valid (e.g., during the event for which the ticket as purchased, during a period of time relative to the event, or other time period). In some embodiments, when the user purchases an item, access may be presented as an optional item to be purchased at checkout. When the user attempts to connect to the network, the registration manager 214 can prompt the user for the access code in addition to account data, as described above with respect to FIG. 2.

Transaction manager 706 can receive transaction data from the point of sale terminal, including an identifier corresponding to the user's payment information and/or purchase details (e.g., purchased item, time, date, purchase amount, coupon codes, etc.). The identifier and purchase details can be stored in purchase history 708. As the user shops subsequently at the store (or at other locations of the same network of stores), using the same payment information, the user's purchase history can be recorded. In some embodiments, when the user visits the store, or other locations of the same network of stores, and the user's device connects to the network, device monitor 710 can identify the user's device and record connection details in usage history 712. The connection details may include time, date, time connected, device details such as apps installed, store location or store identifier, locations within the deployment environment the user visited (e.g., based on signal strength and/or remote units to which the device was connected, etc. Although separate data stores are shown herein, in various embodiments, data may be stored in more or fewer data stores than illustrated which may be local or remote to the access manager 202. In some embodiments, analytics module 714 can analyze account data, usage history data and purchase history data to generate customer profiles. For example, the purchase history may be correlated with the usage history and account data to identify neighborhoods where the customer works and/or lives, the customer's demographics, or other data. The customer profiles may be used to estimate the popularity of particular items, generate coupons or other incentives, or compiled and made available to third parties.

Figure 8:
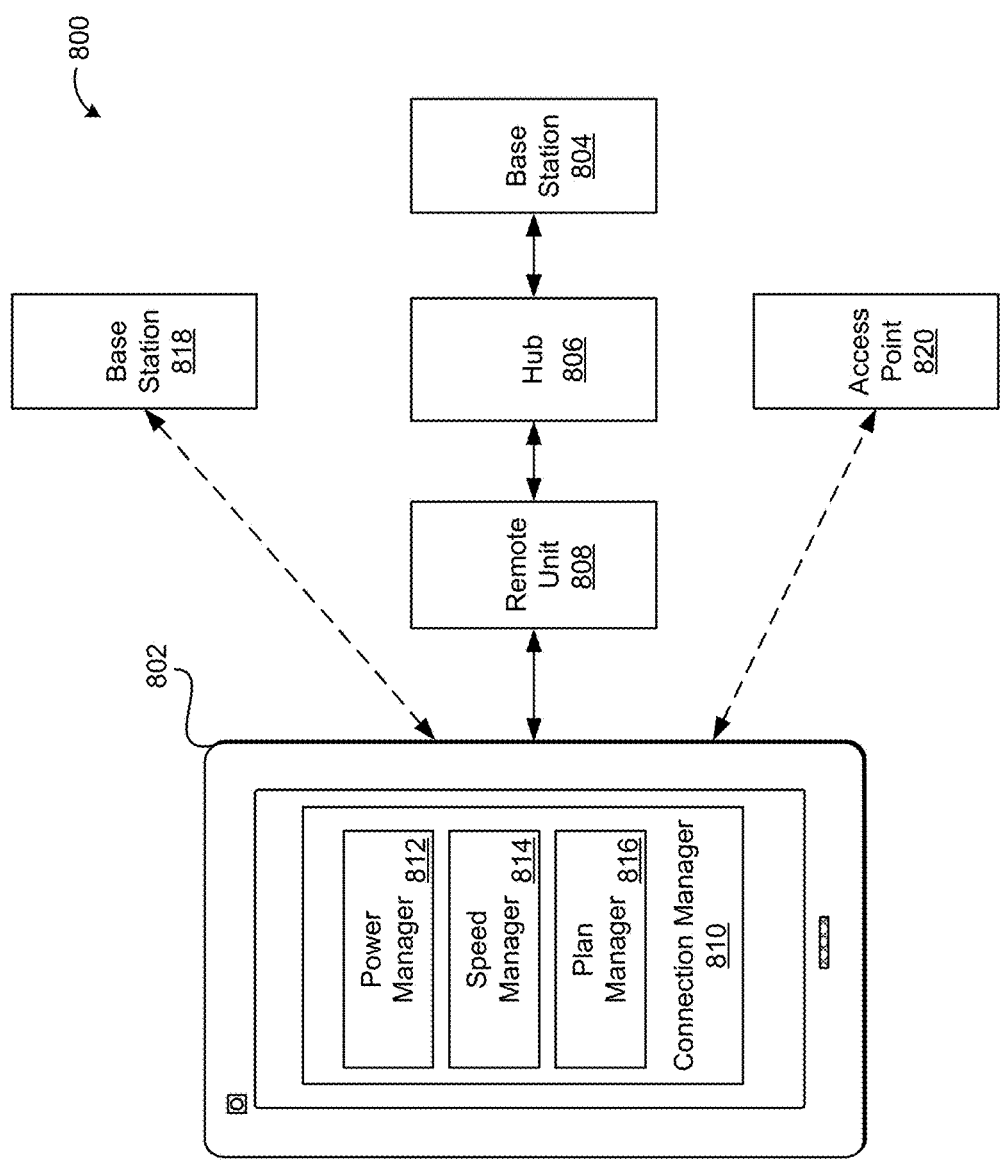
FIG. 8 illustrates a system that controls access to cellular networks, in accordance with an embodiment of the present invention.

FIG. 8 illustrates a system 800 that controls access to cellular networks, in accordance with an embodiment of the present invention. As discussed above, a handoff manager can be used by an access manager to determine whether to enable a device to connect to a base station through the DAS, or to offload the device to an external base station, or other wireless network access point. As shown in FIG. 8, some or all of this functionality may be performed by the device 802. In FIG. 8, device 802 can connect to a cellular network provided by base station 804 through a DAS including at least one hub 806 and at least one remote unit 808. When a user arrives at a DAS deployment environment, connection manager 810 may determine that multiple base stations and/or access points are available to the device. As discussed, this may occur when a user is arriving to a new area by ship, train, or other vehicle, when entering a building, changing floors in a building, or other entering an area with multiple overlapping coverage options. In some embodiments, power manager 812 can monitor power levels of communications received from a base station and connect to the base station 806 if there is a power savings opportunity for the device (e.g., if less power would be required to connect through the DAS than through an external base station. Additionally, or alternatively, a speed manager may monitor data transmission rates of available networks and connect through the DAS where it provides the greatest transmission rate. In some embodiments, a plan manager may determine a cost effective connection for the device 802. For example, where the plan provides unlimited data coverage, plan manager 816 may enable the device 802 to connect to any base station, including external base stations such as base station 818. However, if data is expensive through the device's plan, the plan manager 816 may limit the device to connecting through a Wi-Fi access point 820.

Figure 9:
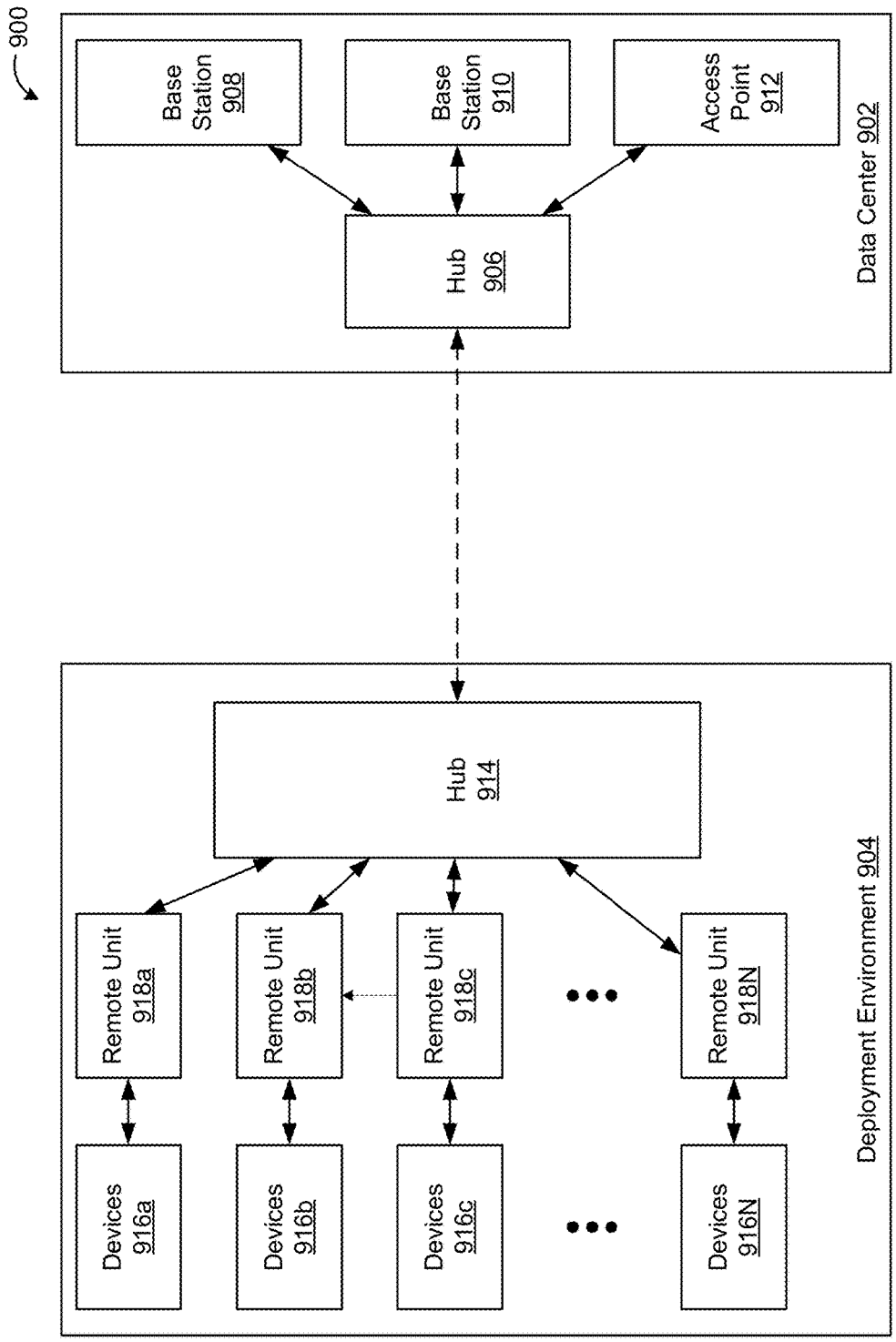
FIG. 9 illustrates a system that uses alternative carriers to provide wireless or mobile networks to a deployment environment, in accordance with an embodiment of the present invention.

FIG. 9 illustrates a system 900 that uses alternative carriers to provide wireless or mobile networks to a deployment environment, in accordance with an embodiment of the present invention. In some embodiments, instead of using fiber optic lines, alternative carriers may be used to transmit data between a data center 902 and a deployment environment 904. As shown in FIG. 9, a hub 906 may receive data from and transmit data to various signal sources, such as base stations 908 and 910, and wireless access point 912. Whereas the hubs described above with respect to fiber optic implementations converted the electrical signals received from the signal sources into an optical signal, hub 906 can modulate a carrier, such as a microwave carrier signal, high frequency carrier signal, long range radio signal, or other carrier signal to include data from the signal sources. The modulated carrier signal can be transmitted from the data center 902 to the deployment environment 904 which may be remote (e.g., several miles to transcontinental distances) from the data center. A hub 914 in the deployment environment may include an antenna that receives the modulated carrier and demodulates the signal. Hub 914 can then transmit the demodulated signals to various devices 916a-916N in the deployment environment 904 using remote units 918a-918N. Data received from the device may similarly be routed by the remote units to hub 914 where it is modulated onto the alternative carrier signal and transmitted back to hub 906 where it is demodulated and sent to the appropriate signal source. Using carrier signals that can be transmitted over greater distances, communications can be brought to more remote areas.

Figure 10:
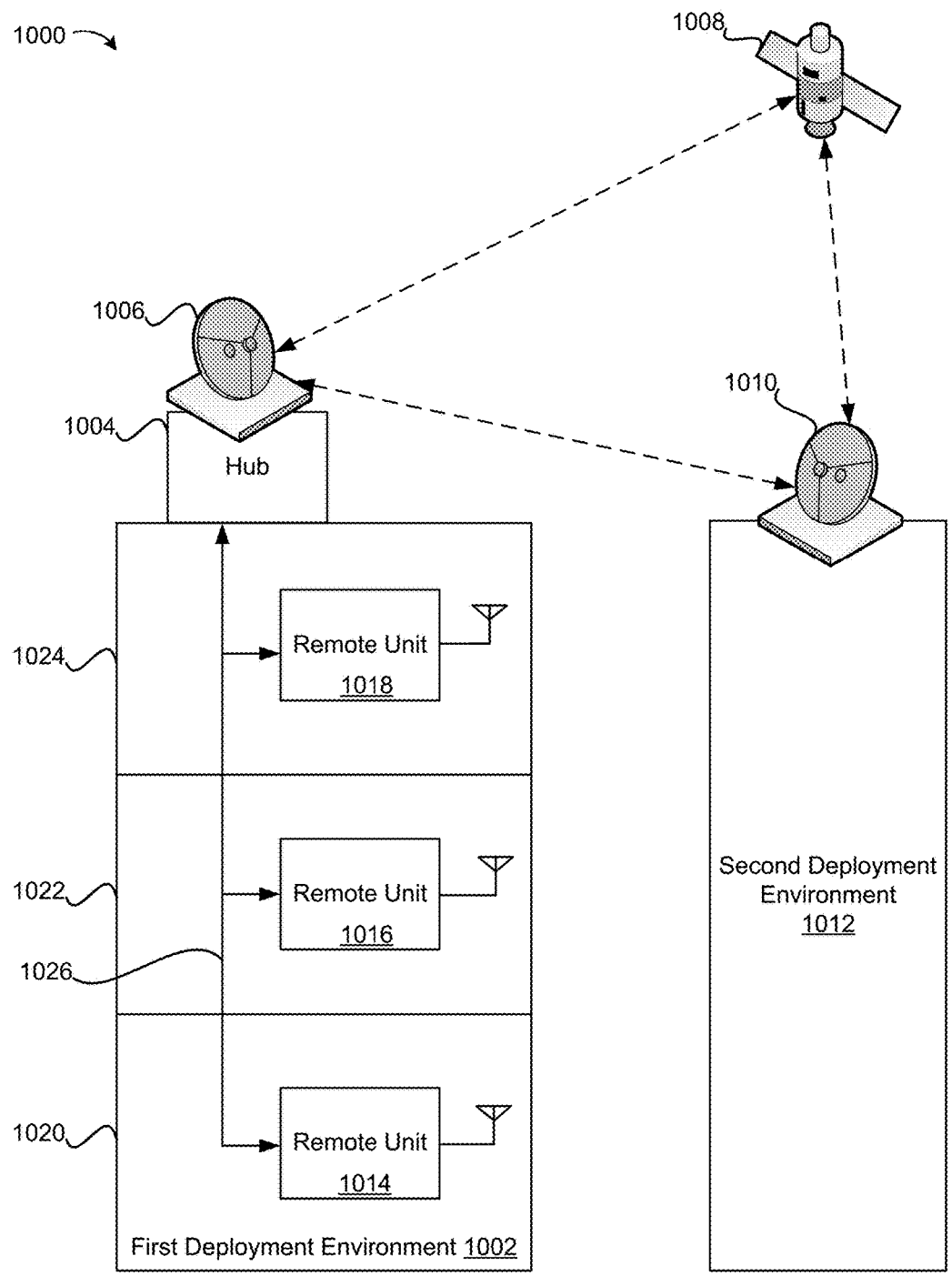
FIG. 10 illustrates a system that controls access to cellular networks, in accordance with an embodiment of the present invention.

FIG. 10 illustrates a system 1000 that controls access to cellular networks, in accordance with an embodiment of the present invention. As discussed above with respect to FIG. 1, a deployment environment may include at least one hub configured to receive signals from, and transmit signals to, one or more signal sources, such as mobile phone base stations, wired or wireless Internet or LANs, or other signals. Typically, deployment environments such as buildings have a backhaul connection that is wired into the building through which the hub can connect to the Internet. This requires deployment environments to have wired connections during construction or to be retrofit with such connections. This can lead to expensive construction projects and may be damaged in the event of earthquakes and other natural disasters.

As shown in FIG. 10, a similar DAS to that described in FIG. 1 can be deployed to a first deployment environment 1002, such as a commercial or residential high rise building. Hub 1004 can be installed on the roof of the deployment environment and can be configured to receive data from, and transmit data to, one or more signal sources. As shown in FIG. 10, hub 1004 may include an antenna, such as a high gain antenna 1006 or antenna array in communication with, e.g., a communications satellite 1008 and/or another antenna 1010 deployed in a second deployment environment 1012. As in FIG. 1, the hub in FIG. 10 can transmit and receive data within the first deployment environment using remote units 1014, 1016, 1018 located in various zones 1020, 1022, 1024 of the first deployment environment. In some embodiments, hub 1004 can be connected to each remote unit through fiber optic cables. Alternatively, coaxial or other transmission line may be used to connect hub 1004 to the remote units.

By connecting hub 1004 to communications satellite 1008, no physical connection is required to be maintained. Instead, a wireless backhaul can be established to provide Internet service and other network connections to the first deployment environment. Additionally, or alternatively, hub 1004 may include a laser transceiver configured to connect to signal sources or other deployment environments. In some embodiments, a mesh network may be formed between multiple deployment environments. As shown in FIG. 10, first deployment environment 1002 can connect using antenna 1006 to second deployment environment 1012 using antenna 1010 to form a mesh network. Although not shown, the mesh network may grow in size, including additional deployment environments. This may be useful, e.g., on university or corporate campuses to create a local network that may be closed to external networks, increasing security within the network while still enabling communication between devices in the connected deployment zones.

Figure 11:
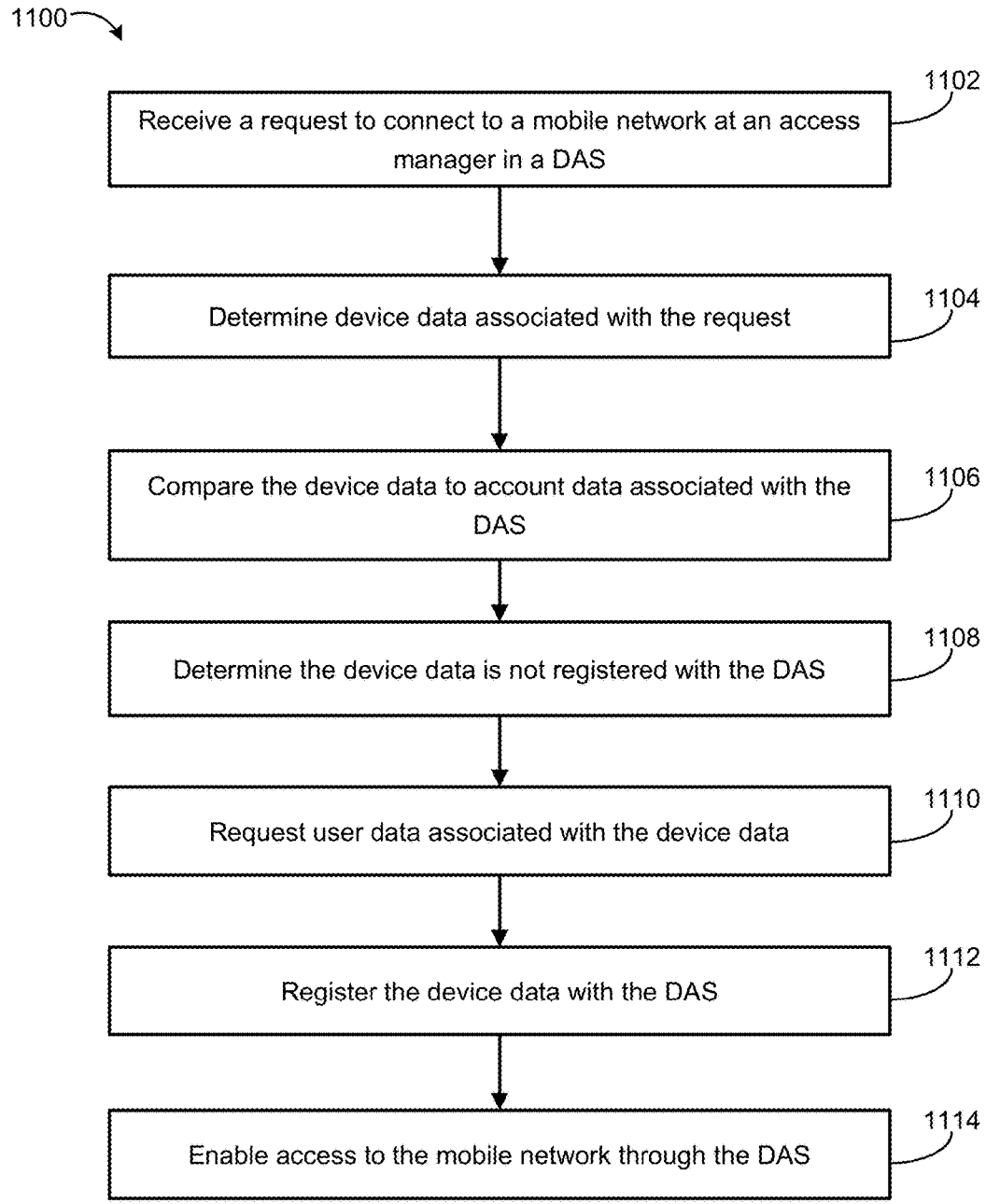
FIG. 11 illustrates a method of registering devices to a cellular network over a distributed antenna system (DAS), in accordance with an embodiment of the present invention.

FIG. 11 illustrates a method 1100 of registering devices to a cellular network over a DAS, in accordance with an embodiment of the present invention. At 1102, a request is received to connect to a mobile network. As discussed above, the request can be received by an access manager associated with the DAS. In some embodiments, the access manager may be a part of one or more of a hub, remote unit, base station, or any other component of the DAS. At 1104, device data associated with the request is determined. At 1106 the device data is compared to account data associated with the DAS to determine whether the requesting device is registered with the DAS. In some embodiments, if the device is registered, access to the mobile network can be enabled. At 1108, it is determined that the device is a not registered with the DAS. At 1110 a registration interface can be caused to be displayed on the requesting device, the registration interface can request user data, such as name, employee ID, phone number, address, etc. At 1112, using the user data and device data, an account is registered with the DAS. At 1114, access to the mobile network through the DAS is enabled for the registered device.

Figure 12:
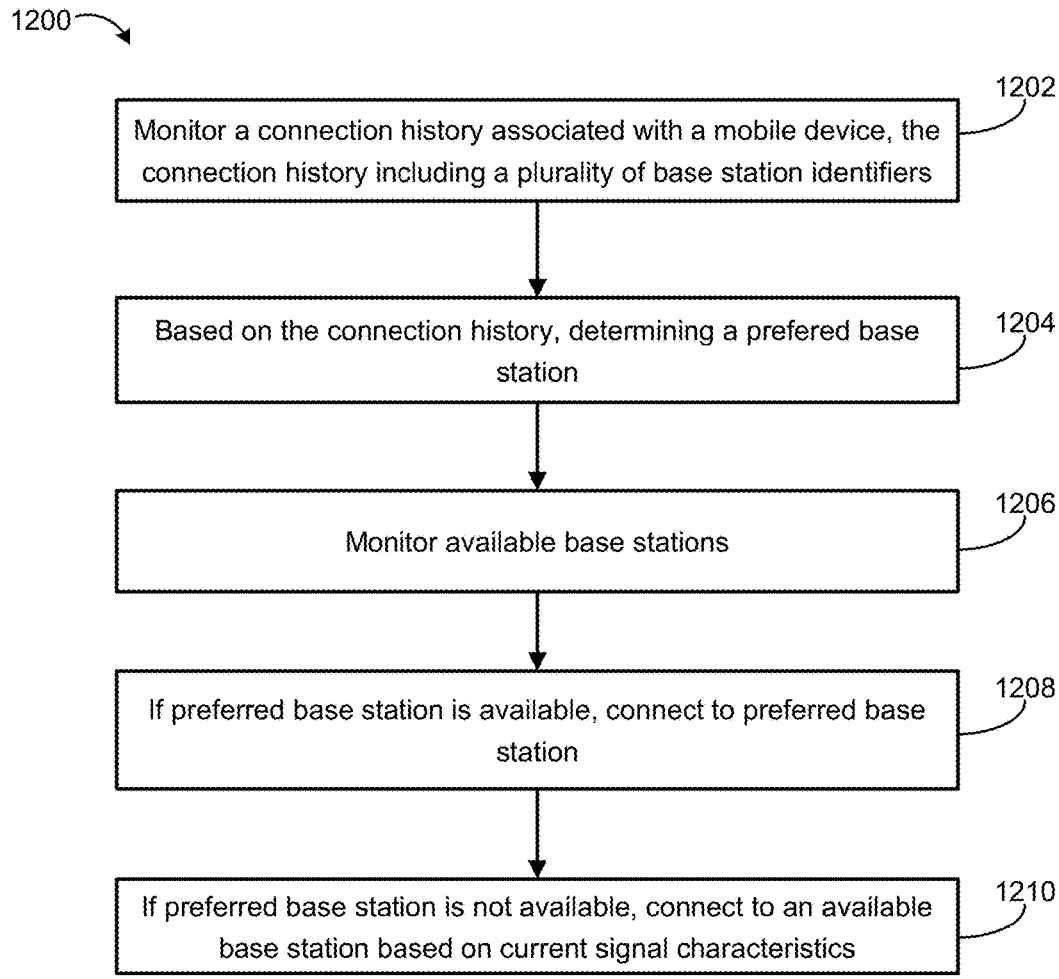
FIG. 12 illustrates a method of accessing a cellular network over a DAS, in accordance with an embodiment of the present invention.

FIG. 12 illustrates a method 1200 of accessing a cellular network over a DAS, in accordance with an embodiment of the present invention. At 1202, a device can monitor its connection history to a mobile network. As discussed above, the connection history may include base station identifiers and times when the device was connected. At 1204, using the connection history, a preferred base station can be identified. For example, if a device connects to the same base station every night because the device is located in a DAS deployment, that base station may be identified as the preferred base station. At 1206, available base stations can be monitored. At 1208, if the preferred base station is available, the device can connect to the preferred base station. At 1210, if the preferred base station is not available, the device can connect to an available base station based on current signal conditions (e.g., signal power, SNR, interference, etc.). This enables devices to develop affinity for a cellular network available through a DAS, even where ordinary base station selection may otherwise choose an external base station. For example, external base stations may be determined to have a higher power, which may ordinarily cause the device to select the external base station. However, the preferred base station can override the ordinary selection process.

Figure 13:
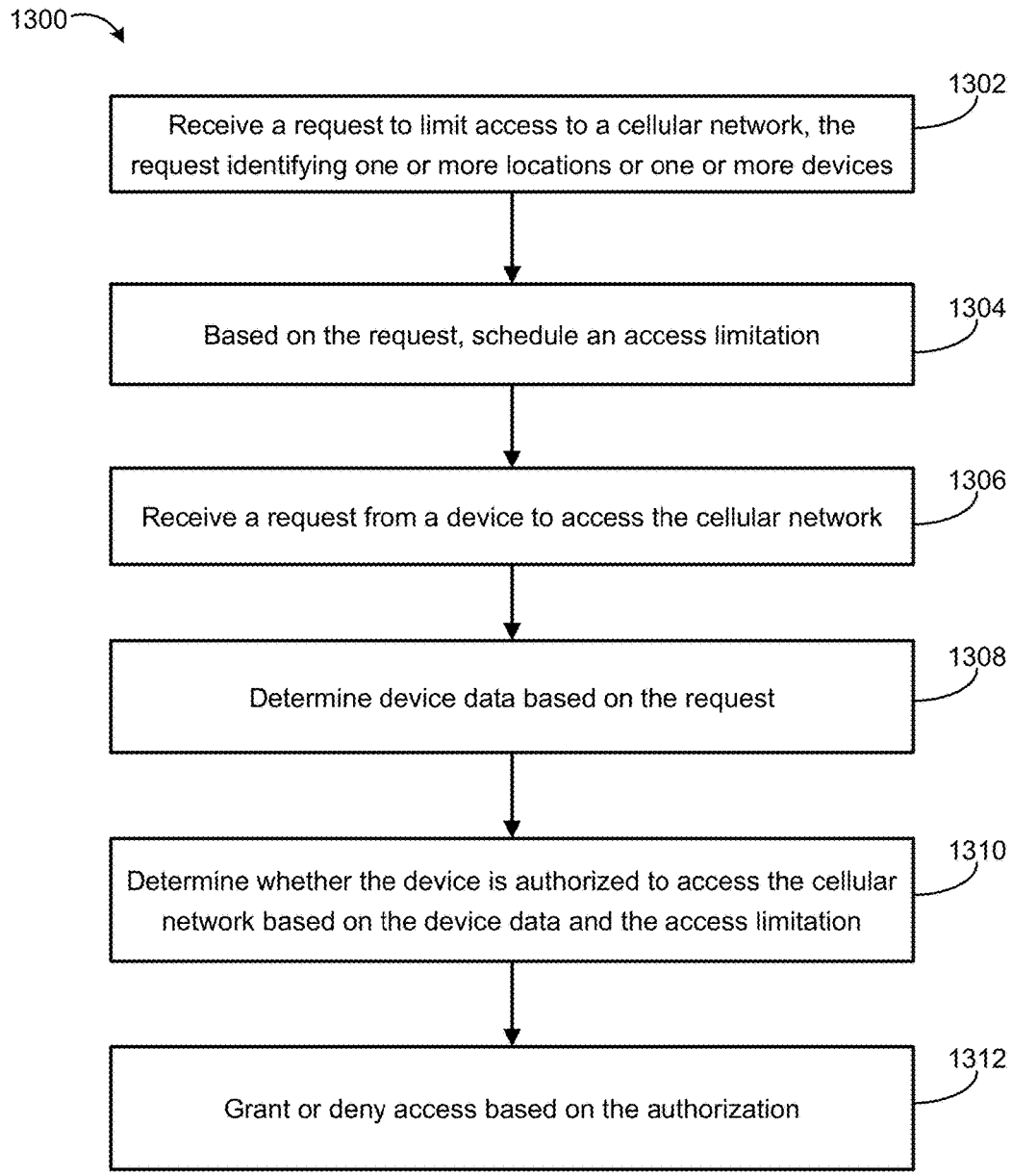
FIG. 13 illustrates a method of controlling access to a cellular network over a DAS, in accordance with an embodiment of the present invention.

FIG. 13 illustrates a method 1300 of controlling access to a cellular network over a DAS, in accordance with an embodiment of the present invention. At 1302, a request is received to limit access to a cellular network. As discussed above, the request may identify one or more characteristics of the access limitation, such as a time period, location (or one or more remote units), particular devices to be restricted/no restricted, etc. At 1304, the limited access period is scheduled based on the request. Subsequently, at 1306, a request is received from a device to access the cellular network. At 1308 device data can be determined from the request. As discussed, the device data may be included with the request or queried from the requesting device. At 1310 it can be determined whether the device is authorized to access the cellular network based on the device data and the access limitation. For example, if the device is attempting to access the cellular network from a restricted area, or through a restricted remote unit, and is not exempted from the access restriction, then the request can be denied 1312. If however, the access limitation has ended, the device is exempted from the limitation, or the request is coming from an unrestricted area of the deployment environment, then the request can be granted 1312.

Figure 14:
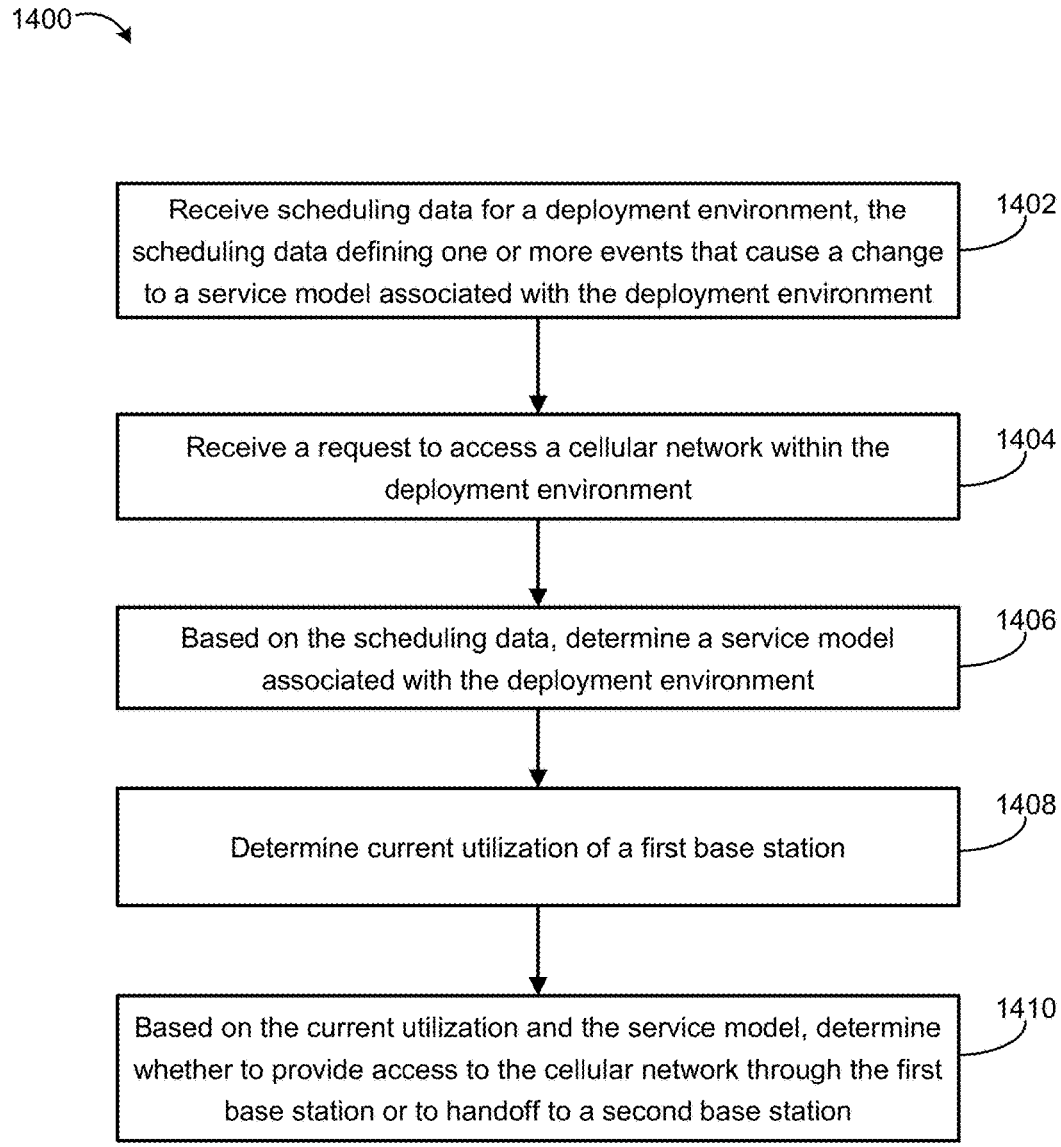
FIG. 14 illustrates a method of managing utilization in a DAS, in accordance with an embodiment of the present invention.

FIG. 14 illustrates a method 1400 of managing utilization in a DAS, in accordance with an embodiment of the present invention. At 1402, scheduling data for a deployment environment may be received. As discussed above, the scheduling data may define one or more events during which a service model is changed for the deployment environment. For example, in an event space, a per user access charge may be implemented during an event, while a subscription model or free access may be implemented when no event is scheduled. At 1404, a request to access a cellular network is received from within the deployment environment. At 1406, based on the scheduling data, a service model associated with the deployment environment is determined. At 1408, current utilization of a base station in the deployment environment is determined. At 1410, based on the current utilization and the service model, determine whether to provide access to the cellular network through the base station in the deployment environment or to hand off to a base station outside the deployment environment.

Figure 15:
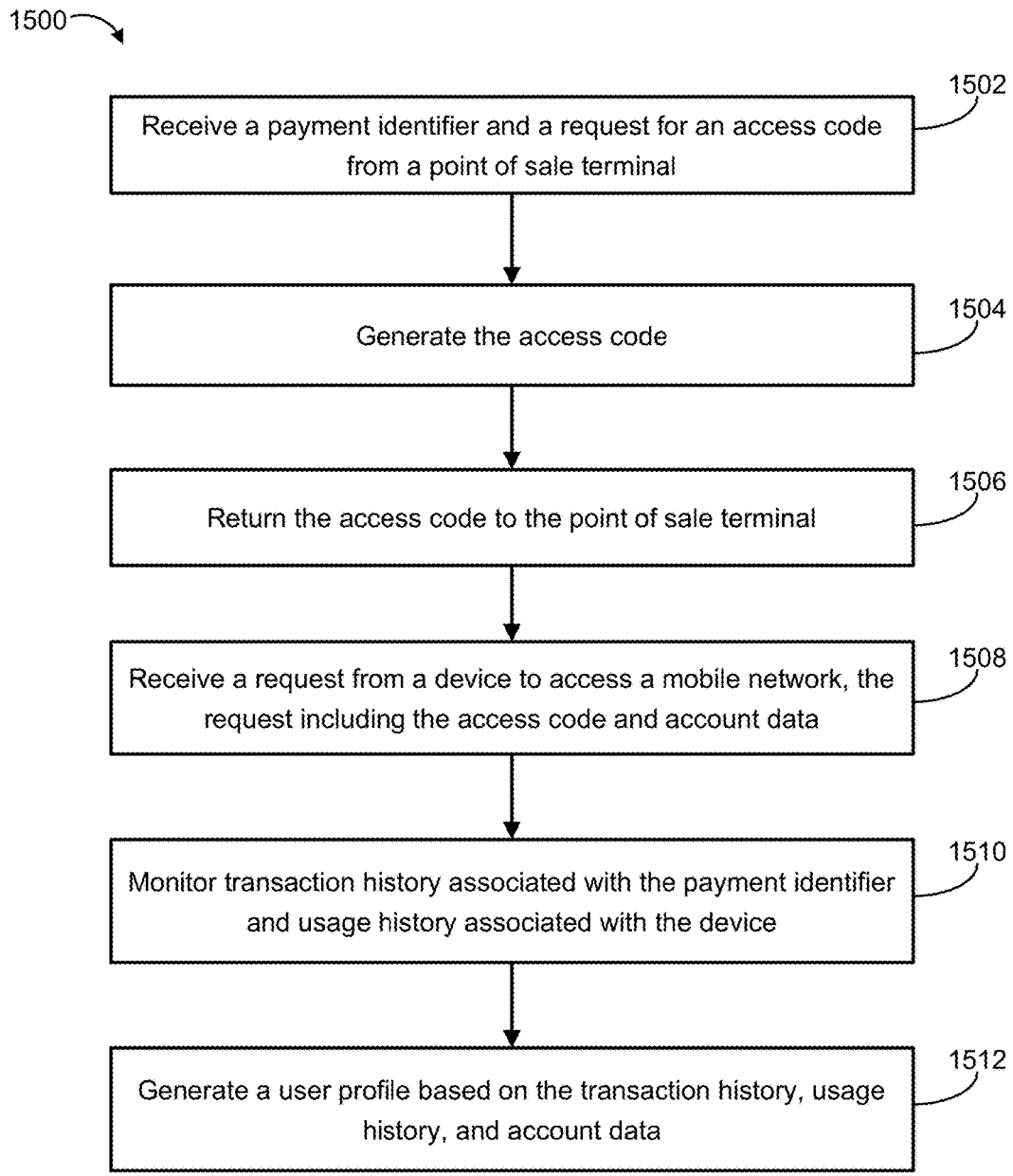
FIG. 15 illustrates a method of providing cellular service as an add-on over a DAS, in accordance with an embodiment of the present invention.

FIG. 15 illustrates a method 1500 of providing cellular service as an add-on over a DAS, in accordance with an embodiment of the present invention. At 1502, a payment identifier and request for an access code can be received from a point of sale terminal. As discussed above, the request may be received following a purchase transaction and the access code is to provide network service as an add-on. At 1504, an access code can be generated and at 1506 the access code can be returned to the point of sale terminal. The access code can be sent to the user on a paper receipt or electronically. At 1508 a request to access a mobile network can be received from a device, the request can include the access code and account data. At 1510 based on the payment identifier and device information, the transaction history of the customer and the usage history of the device can be monitored. At 1512, a user profile can be generated based on the account data, transaction history, and usage history.

Figure 16:
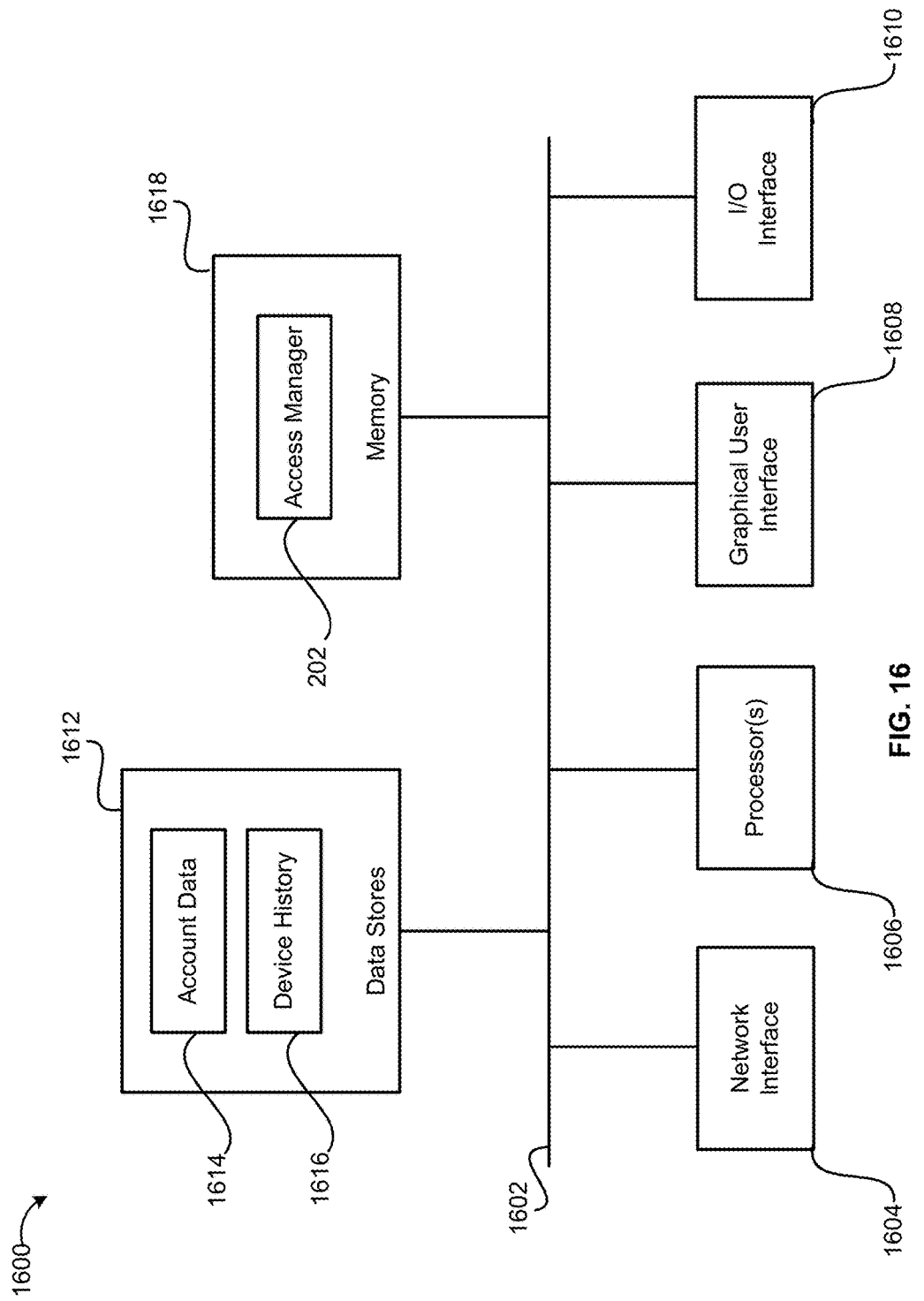
FIGS. 16-19 illustrate a high level block diagram of a computer system, in accordance with an embodiment of the present invention.

FIG. 16 illustrates a high level block diagram of a computer system 1600, in accordance with an embodiment of the present invention. As shown in FIG. 16, a computer system can include hardware elements connected via a bus 1602, including a network interface 1604, that enables the computer system to connect to other computer systems over a wireless local area network (WLAN), wide area network (WAN), mobile network (e.g., EDGE, 3G, 4G, or other mobile network), or other network. Network interface 1604 can further include a wired or wireless interface for connecting to infrared, Bluetooth, or other wireless devices, such as other client devices, network resources, or other wireless capable devices. The computer system can further include one or more processors 1606, such as a central processing unit (CPU), field programmable gate array (FPGA), application-specific integrated circuit (ASIC), network processor, or other processor. Processors may include single or multi-core processors.

In some embodiments, the computer system can include a graphical user interface (GUI) 1608. GUI 1608 can connect to a display (LED, LCD, tablet, touch screen, or other display) to output user viewable data. In some embodiments, GUI 1608 can be configured to receive instructions (e.g., through a touch screen or other interactive interface). In some embodiments, I/O interface 1610 can include various interfaces for user input devices including keyboards, mice, or other user input devices.

In some embodiments, the computer system may include local or remote data stores 1612. Data stores 1612 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 1610 can include data generated, stored, or otherwise utilized as described herein. For example, data stores 1610 can include all or portions of account data 1614 as well as device history 1616, and other data. Memory 1618 can include various memory technologies, including RAM, ROM, EEPROM, flash memory or other memory technology. Memory 1618 can include executable code to implement methods as described herein, such as access manager 202.

Figure 17:
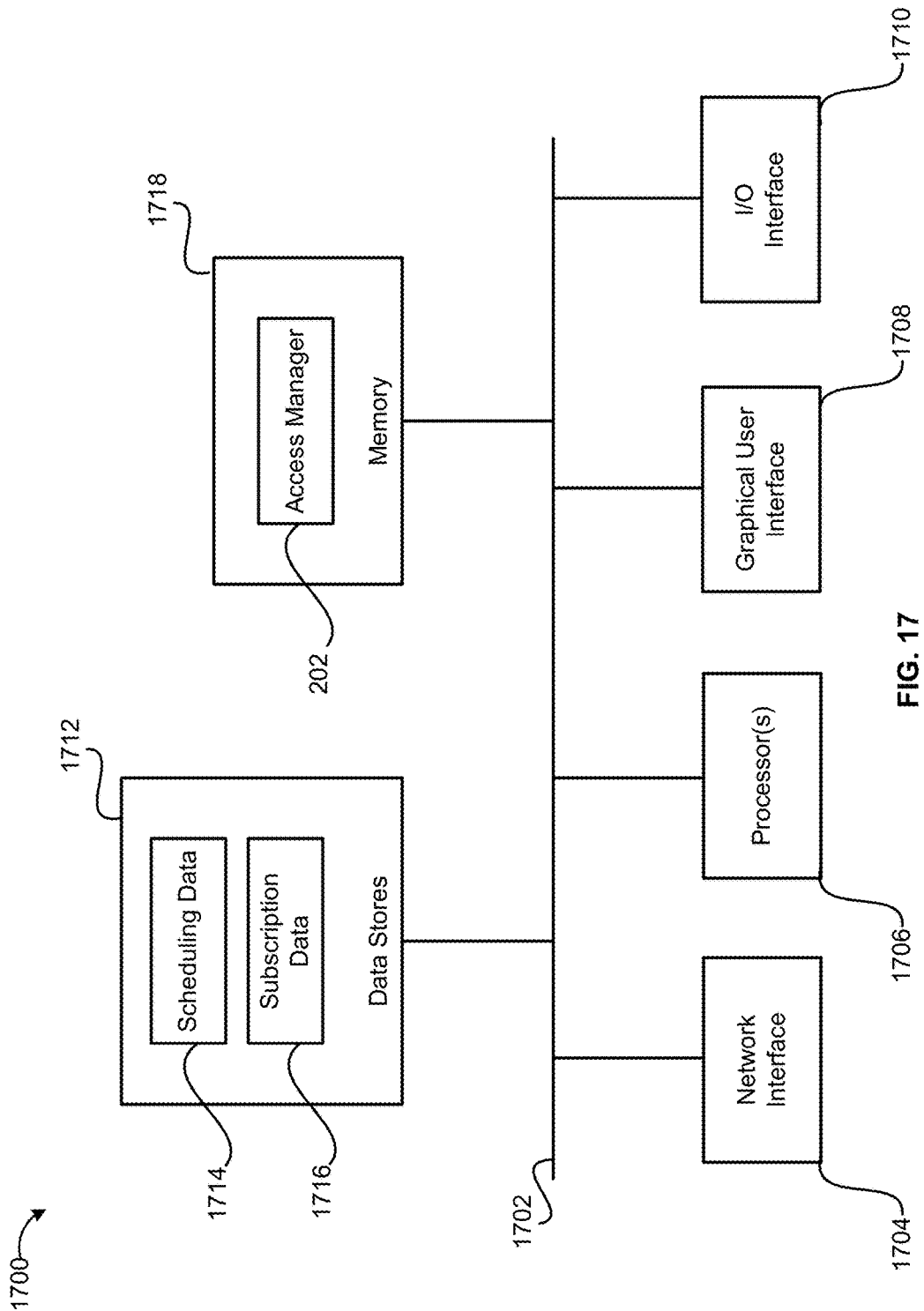

FIG. 17 illustrates a high level block diagram of a computer system 1700, in accordance with an embodiment of the present invention. As shown in FIG. 17, a computer system can include hardware elements connected via a bus 1702, including a network interface 1704, that enables the computer system to connect to other computer systems over a wireless local area network (WLAN), wide area network (WAN), mobile network (e.g., EDGE, 3G, 4G, or other mobile network), or other network. Network interface 1704 can further include a wired or wireless interface for connecting to infrared, Bluetooth, or other wireless devices, such as other client devices, network resources, or other wireless capable devices. The computer system can further include one or more processors 1706, such as a central processing unit (CPU), field programmable gate array (FPGA), application-specific integrated circuit (ASIC), network processor, or other processor. Processors may include single or multi-core processors.

In some embodiments, the computer system can include a graphical user interface (GUI) 1708. GUI 1708 can connect to a display (LED, LCD, tablet, touch screen, or other display) to output user viewable data. In some embodiments, GUI 1708 can be configured to receive instructions (e.g., through a touch screen or other interactive interface). In some embodiments, I/O interface 1710 can include various interfaces for user input devices including keyboards, mice, or other user input devices.

In some embodiments, the computer system may include local or remote data stores 1712. Data stores 1712 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 1710 can include data generated, stored, or otherwise utilized as described herein. For example, data stores 1710 can include all or portions of scheduling data 1714 as well as subscription data 1716, and other data. Memory 1718 can include various memory technologies, including RAM, ROM, EEPROM, flash memory or other memory technology. Memory 1718 can include executable code to implement methods as described herein, such as access manager 202.

Figure 18:
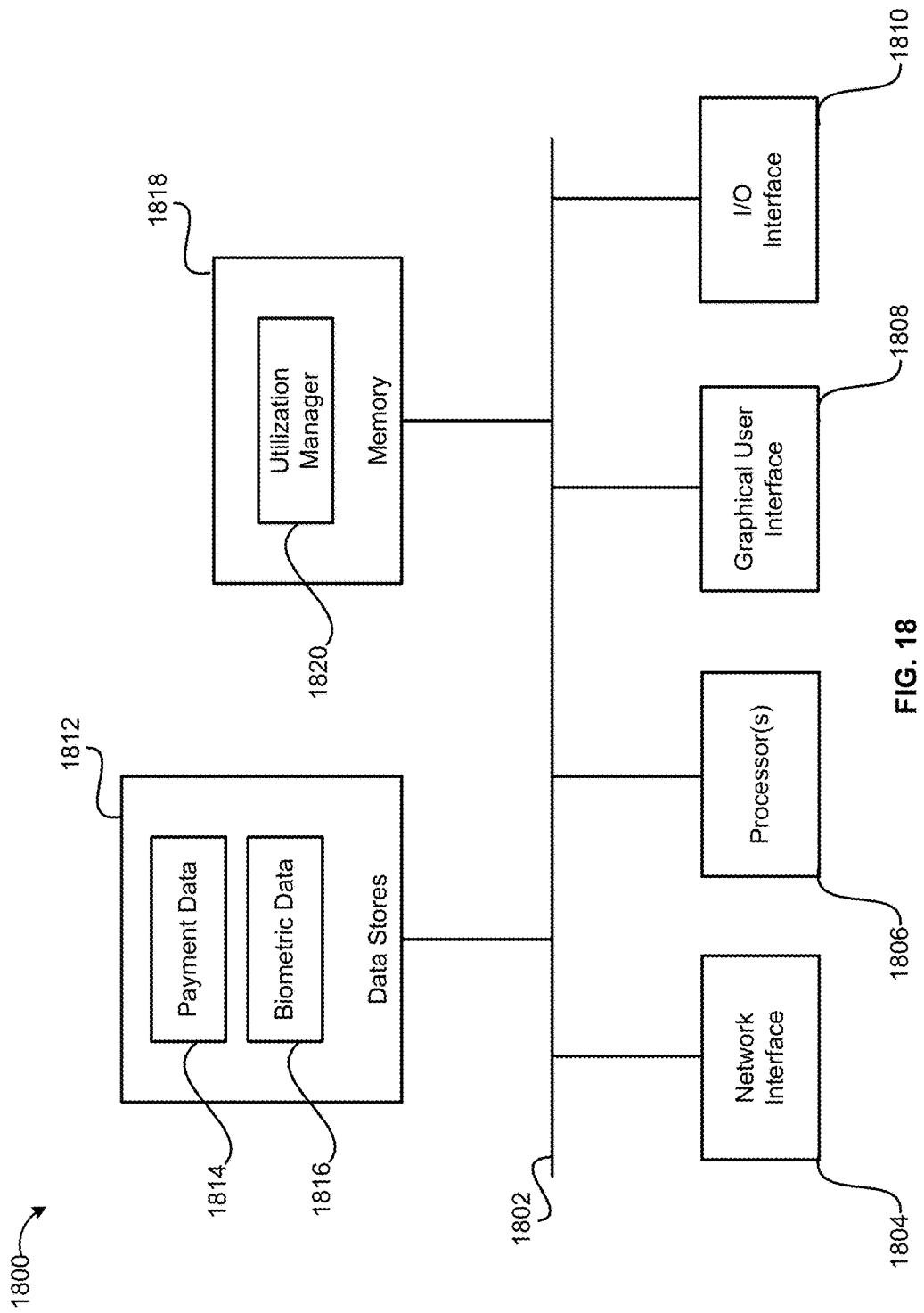

FIG. 18 illustrates a high level block diagram of a computer system 1800, in accordance with an embodiment of the present invention. As shown in FIG. 18, a computer system can include hardware elements connected via a bus 1802, including a network interface 1804, that enables the computer system to connect to other computer systems over a wireless local area network (WLAN), wide area network (WAN), mobile network (e.g., EDGE, 3G, 4G, or other mobile network), or other network. Network interface 1804 can further include a wired or wireless interface for connecting to infrared, Bluetooth, or other wireless devices, such as other client devices, network resources, or other wireless capable devices. The computer system can further include one or more processors 1806, such as a central processing unit (CPU), field programmable gate array (FPGA), application-specific integrated circuit (ASIC), network processor, or other processor. Processors may include single or multi-core processors.

In some embodiments, the computer system can include a graphical user interface (GUI) 408. GUI 1808 can connect to a display (LED, LCD, tablet, touch screen, or other display) to output user viewable data. In some embodiments, GUI 1808 can be configured to receive instructions (e.g., through a touch screen or other interactive interface). In some embodiments, I/O interface 1810 can include various interfaces for user input devices including keyboards, mice, or other user input devices.

In some embodiments, the computer system may include local or remote data stores 1812. Data stores 1812 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 1810 can include data generated, stored, or otherwise utilized as described herein. For example, data stores 1810 can include all or portions of account data 1814 as well as device history 1816, and other data. Memory 1818 can include various memory technologies, including RAM, ROM, EEPROM, flash memory or other memory technology. Memory 1818 can include executable code to implement methods as described herein, such as access manager 202.

Figure 19:
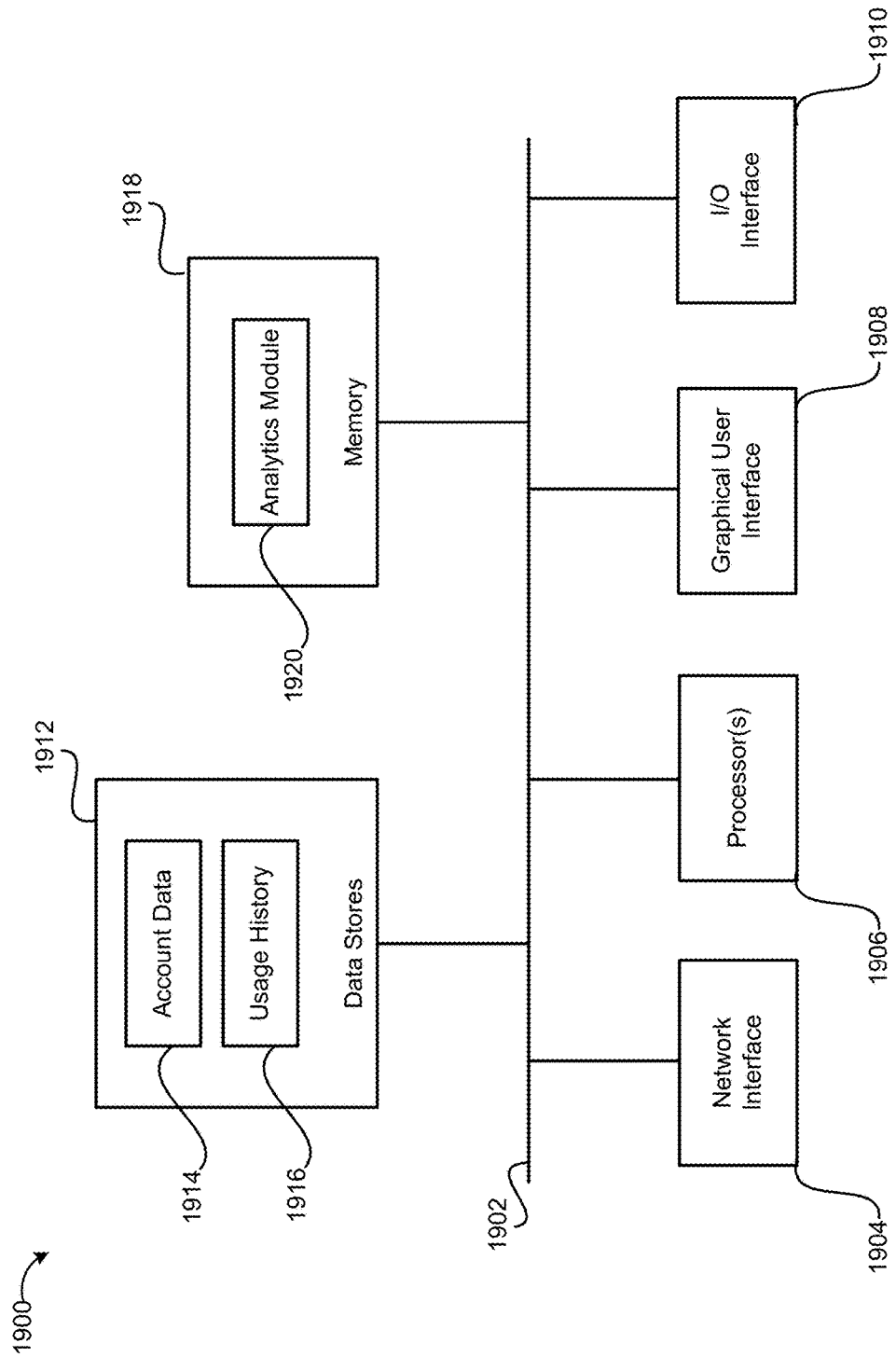

FIG. 19 illustrates a high level block diagram of a computer system 1900, in accordance with an embodiment of the present invention. As shown in FIG. 19, a computer system can include hardware elements connected via a bus 1902, including a network interface 1904, that enables the computer system to connect to other computer systems over a wireless local area network (WLAN), wide area network (WAN), mobile network (e.g., EDGE, 3G, 4G, or other mobile network), or other network. Network interface 1904 can further include a wired or wireless interface for connecting to infrared, Bluetooth, or other wireless devices, such as other client devices, network resources, or other wireless capable devices. The computer system can further include one or more processors 1906, such as a central processing unit (CPU), field programmable gate array (FPGA), application-specific integrated circuit (ASIC), network processor, or other processor. Processors may include single or multi-core processors.

In some embodiments, the computer system can include a graphical user interface (GUI) 1908. GUI 1908 can connect to a display (LED, LCD, tablet, touch screen, or other display) to output user viewable data. In some embodiments, GUI 1908 can be configured to receive instructions (e.g., through a touch screen or other interactive interface). In some embodiments, I/O interface 1910 can include various interfaces for user input devices including keyboards, mice, or other user input devices.

In some embodiments, the computer system may include local or remote data stores 1912. Data stores 1912 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 1910 can include data generated, stored, or otherwise utilized as described herein. For example, data stores 1910 can include all or portions of account data 1914 as well as usage history 1916, and other data. Memory 1918 can include various memory technologies, including RAM, ROM, EEPROM, flash memory or other memory technology. Memory 1918 can include executable code to implement methods as described herein, such as analytics module 1920.

A computing device typically will include an operating system that provides executable program instructions for the general administration and operation of that computing device and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated herein. Thus, the depiction of the systems herein should be taken as being illustrative in nature and not limiting to the scope of the disclosure.

A computing device typically will include an operating system that provides executable program instructions for the general administration and operation of that computing device and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated herein. Thus, the depiction of the system herein should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

Embodiments of the present invention provide techniques for managing device handoff and access control in a DAS providing one or more mobile networks. The DAS may include a centralized hub that may interface with various base stations to provide one or more mobile networks in a DAS deployment. In some embodiments, the centralized hub may communicate with one or more remote units that convert signals received from the centralized hub to be communicated using one of the distributed antennas. When a device attempts to connect to the mobile network, an access manager in the DAS can determine whether the device is authorized to access the mobile network from that location at that time. In various embodiments, handoff between base stations provided through the DAS and external base stations or access points may be managed by devices or the DAS based on power, performance, cost, or other factors.

Embodiments of the present invention provide techniques for managing base station utilization in a DAS and applying different service models to one or more mobile networks provided through the DAS. When a device attempts to connect to the mobile network, current utilization of the mobile network and a current service model can be used to determine whether the device can access the mobile network. For example, a DAS may be deployed to a residential building and residents are guaranteed a quality of service over the mobile network provided through the DAS. If the mobile network is over capacity, the device may be handed off to a base station outside of the DAS deployment environment. In various embodiments, the service model applied to a given DAS deployment may vary depending on e.g., time of day, day of the week, scheduled event, etc.

Embodiments of the present invention provide techniques for providing network access as an add-on in a DAS. The DAS may include a centralized hub that may interface with various base stations to provide one or more mobile networks in a DAS deployment. Access to a mobile or wireless network provided by the DAS can be granted as an add-on service when a user makes a purchase at a commercial space. When the purchase has been made, an access manager can receive a request to generate an access code which can be returned to the user. When a device attempts to connect to the mobile network, the access can be requested. Once the user has accessed the network using the access code, the user's usage of the network can be monitored and correlated to their transaction history and account data to generate a user profile.

In some embodiments, a computer-implemented method may comprise receiving a request limit access to a mobile network at an access manager in a DAS, the request identifying one or more locations or one or more device identifiers. The method may comprise, based on the request, scheduling an access limitation, receiving a request from a mobile device to connect to the mobile network through the DAS, determining device data associated with the request, determining whether the mobile device is authorized to access the mobile network based on the device data and the access limitation, and granting or denying access based on the authorization.

In some embodiments, a computer-implemented method may comprise receiving scheduling data for a deployment environment, the scheduling data defining one or more events that cause a change to a service model associated with the deployment environment. The method may further comprise receiving a request to access a cellular network within the deployment environment, based on the scheduling data, determining a service model associated with the deployment environment, determining current utilization of a first base station; and based on the current utilization and the service model, determining whether to provide access to the cellular network through the first base station or to handoff to a second base station.

In some embodiments, a computer-implemented method may comprise receiving a payment identifier and a request for an access code from a point of sale terminal, generating an access code, returning the access code to the point of sale terminal, receiving a request from a mobile device to connect to a mobile network through a DAS, the request including the access code and account data, monitoring transaction history associated with the payment identifier and usage history associated with the mobile device, and generating a user profile based on the transaction history, usage history, and account data.

In some embodiments, a computer-implemented method may comprise receiving a request from a mobile device to connect to a mobile network at an access manager in a distributed antenna system (DAS), determining device data associated with the request, comparing the device data to account data associated with the DAS, determining the device data is not registered with the DAS, requesting user data from the mobile device, registering the mobile device with the DAS using the device data and the user data, and enabling access to the mobile network through the DAS.

In some embodiments, a computer-implemented method may comprise monitoring a connection history associated with a mobile device, the connection history including a plurality of base station identifiers, determining a preferred base station based at least on the connection history, monitoring available base stations, if the preferred base station is available, connecting to the preferred base station, and if the preferred base station is unavailable, and connecting to an available base station based on current signal characteristics.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, at an antenna of a remote unit of a distributed antenna system (DAS), a request from a client device to access one or more signal sources;
    providing the request from the remote unit to an access manager computer system;
    determining, by the access manager computer system, device data based on the request;
    accessing, by the access manager computer system, registered account data associated with the DAS;
    comparing, by the access manager computer system, the device data to the registered account data;
    enabling, by the access manager computer system when the device data corresponds to at least a portion of the registered account data, the client device to access one of the signal sources via the remote unit and a hub of the DAS;
    registering, by the access manager computer system when the device data does not correspond to at least a portion of the registered account data, the client device based on the device data; and
    enabling, by the access manager computer system based on completion of the registering, the client device to access one of the signal sources via the remote unit and the hub of the DAS;
    determining, by the access manager computer system, a connection history associated with the client device, wherein the connection history comprises a plurality of signal source identifiers;
    determining, by the access manager computer system, a preferred signal source based at least on the connection history;
    monitoring, by the access manager computer system via the hub of the DAS, available signal sources;
    enabling, by the access manager computer system if the preferred signal source is available, the client device to access the preferred signal source via the hub of the DAS; and
    enabling, by the access manager computer system if the preferred signal source is unavailable, the client device to access one of the available signal sources, wherein the available signal source is selected based on current signal characteristics of the available signal sources.

2. The method of claim 1, further comprising providing a service level to the client device based on the registered account data.

3. The method of claim 2, wherein the service level is based on a user of the client device and a location of the DAS.

4. The method of claim 2, wherein the service level is based on a type of the client device.

5. The method of claim 2, wherein the service level is based on a type of traffic for the client device.

6. The method of claim 1, further comprising:
    identifying, by the access manager computer system, a service model associated with the DAS; and
    applying, by the access manager computer system, the service model to the client device access.

7. The method of claim 6, wherein the service model is based on the time of day, day of the week, or a scheduled event.

8. The method of claim 1, wherein the device data comprises an access code, and wherein the access of the client device to the signal source is enabled based on the access code.

9. The method of claim 8, wherein the access code is associated with a previous purchase by a user of the client device.

10. The method of claim 1, wherein the one or more signal sources comprise a plurality of signal sources connected to the DAS via the hub, further comprising:
    determining, by the access manager computer system, characteristics of each of the plurality of signal sources; and
    modifying, by the access manager computer system, the client device access to a different signal source of the plurality of signal sources based on the characteristics.

11. The method of claim 10, wherein the one or more signal sources comprise one or more cellular base stations.

12. The method of claim 1, wherein the device data comprises device phone number, MAC address, mobile identification number, mobile subscription identification number, International Mobile Subscriber Identity (IMSI), or Mobile Station International Subscriber Directory Number (MSISDN).

13. The method of claim 1, wherein the device data comprises device type, operating system, manufacturer, or model number.

14. The method of claim 1, wherein registering the client device comprises:
    causing, by the access manager computer system, the client device to display a registration interface; and
    receiving, by the access manager computer system from the client device based on a user input to the registration interface, registration data; and
    registering, by the access manager computer system, the client device based on the registration data.

15. The method of claim 1, wherein registering the client device comprises:
    determining, by the access manager computer system, a frequency of contact of the DAS with the client device; and
    registering, by the access manager computer system, the client device based on the frequency of contact.

16. The method of claim 1, further comprising:
    determining, by the access manager computer system, that the client device has moved outside of a deployment area; and
    disabling, by the access manager computer system, the access of the client device to the signal source based on the client device moving outside of the deployment area.

17. The method of claim 16, wherein the determination that the client device has moved outside of the deployment area is based on a signal strength of the client device.

18. A distributed antenna system (DAS), comprising:
    at least one remote unit configured to communicate with a plurality of client devices;
    at least hub configured to communicated with a plurality of signal sources; and
    an access manager computer system coupled to the at least one remote unit and the hub, comprising:
        one or more memories configured to store instructions; and
        one or more processors configured to execute the instructions to:
            receive, via an antenna of one of the at least one remote units, a request from a client device to access one or more signal sources,
            determine device data based on the request,
            access registered account data associated with the DAS, compare the device data to the registered account data, enable, when the device data corresponds to at least a portion of the registered account data, the client device to access one of the signal sources via the hub and the at least one remote unit, register, when the device data does not correspond to at least a portion of the registered account data, the client device based on the device data, enable, based on completion of the registration, the client device to access one of the signal sources via the hub and the at least one remote unit, determine a connection history associated with the client device, wherein the connection history comprises a plurality of signal source identifiers, determine a preferred signal source based at least on the connection history, monitor, via the at least one hub, available signal sources, enable, if the preferred signal source is available, the client device to access the preferred signal source via the at least one hub, and enable, if the preferred signal source is unavailable, the client device to access one of the available signal sources, wherein the available signal source is selected based on current signal characteristics of the available signal sources.

19. A non-transitory computer-readable storage medium comprising instructions stored therein, which when executed by one or more processors of an access manager computer system of a distributed antenna system including a hub and one or more remote units, cause the one or more processors to perform operations comprising:

receiving, via an antenna of a remote unit of a distributed antenna system (DAS), a request from a client device to access one or more signal sources;

determining device data based on the request;

accessing registered account data associated with the DAS;

comparing the device data to the registered account data;

enabling, when the device data corresponds to at least a portion of the registered account data, the client device to access one of the signal sources via the remote unit and a hub of the DAS;

registering, when the device data does not correspond to at least a portion of the registered account data, the client device based on the device data;

enabling, based on completion of the registering, the client device to access one of the signal sources via the remote unit and the hub of the DAS;

determining a connection history associated with the client device, wherein the connection history comprises a plurality of signal source identifiers;

determining a preferred signal source based at least on the connection history;

monitoring, via the hub of the DAS, available signal sources;

enabling, if the preferred signal source is available, the client device to access the preferred signal source via the hub of the DAS; and enabling, if the preferred signal source is unavailable, the client device to access one of the available signal sources, wherein the available signal source is selected based on current signal characteristics of the available signal sources.

* * * * *